US012641483B2

(12) United States Patent
Garcia et al.

(10) Patent No.: US 12,641,483 B2
(45) Date of Patent: May 26, 2026

(54) REINFORCEMENT LEARNING BASED INTER-RADIO ACCESS TECHNOLOGY LOAD BALANCING UNDER MULTI-CARRIER DYNAMIC SPECTRUM SHARING

(71) Applicant: NOKIA SOLUTIONS AND NETWORKS OY, Espoo (FI)

(72) Inventors: Ian Garcia, Naperville, IL (US); Hua Xu, Naperville, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 543 days.

(21) Appl. No.: 17/624,315

(22) PCT Filed: Jul. 3, 2019

(86) PCT No.: PCT/US2019/040574
§ 371 (c)(1),
(2) Date: Dec. 31, 2021

(87) PCT Pub. No.: WO2021/002866
PCT Pub. Date: Jan. 7, 2021

(65) Prior Publication Data
US 2022/0377610 A1 Nov. 24, 2022

(51) Int. Cl.
*H04W 28/082* (2023.01)
*H04W 28/08* (2023.01)
*H04W 16/14* (2009.01)

(52) U.S. Cl.
CPC ..... *H04W 28/082* (2023.05); *H04W 28/0958* (2020.05); *H04W 16/14* (2013.01)

(58) Field of Classification Search
CPC .. H04L 5/0062; H04W 16/10; H04W 28/082; H04W 28/16; H04W 28/0958
See application file for complete search history.

(56) References Cited

U.S. PATENT DOCUMENTS

2004/0082338 A1* 4/2004 Norrgard ............ H04L 47/2491
370/328
2007/0064646 A1* 3/2007 Esteves ................ H04W 28/04
370/442
(Continued)

FOREIGN PATENT DOCUMENTS

CN 102150466 A 8/2011
CN 103959862 A 7/2014
(Continued)

OTHER PUBLICATIONS

H. Shajaiah, "Resource Allocation with Carrier Aggregation for Spectrum Sharing in Cellular Networks", Dissertation submitted to the Faculty of the Virginia Polytechnic Institute and State University in partial fulfillment of the requirements for the degree of Doctor of Philosophy in Electrical Engineering, Mar. 14, 2016, Arlington, Virginia, 272 pages.
(Continued)

*Primary Examiner* — Jason E Mattis
*Assistant Examiner* — Bao G Nguyen
(74) *Attorney, Agent, or Firm* — SQUIRE PATTON BOGGS (US) LLP

(57) ABSTRACT

A method may include receiving, at a reinforcement learning load balancer, a load metric related to available resources of a carrier. The method may also include calculating, based on the load metric, an update to carrier assignment parameters for a user. The method may further include calculating, based on the load metric, an update to uplink/downlink split proportions and resource pool split proportions. In addition, the method may include predicting an impact of the update to the carrier assignment parameters, the update to the uplink/downlink split proportions, and the update to the resource pool split proportions to the load metric. Further, the method may include communicating the update to carrier assignment parameters, the update to uplink/downlink split
(Continued)

proportions, and the update to resource pool split proportions to one or more radio resource managers of corresponding one or more radio access technologies for application to a communication network.

17 Claims, 12 Drawing Sheets

(56) References Cited

U.S. PATENT DOCUMENTS

| | | | |
|---|---|---|---|
| 2011/0149898 A1 | 6/2011 | Kim et al. | |
| 2012/0307922 A1* | 12/2012 | Simonsson | H04W 72/542 |
| | | | 455/67.11 |
| 2013/0279376 A1 | 10/2013 | Ahmadi | |
| 2014/0129715 A1 | 5/2014 | Mortazavi | |
| 2015/0092553 A1* | 4/2015 | Sirotkin | H04W 72/52 |
| | | | 370/235 |
| 2015/0189664 A1* | 7/2015 | Hu | H04W 72/541 |
| | | | 370/329 |
| 2015/0237645 A1 | 8/2015 | Andrianov et al. | |
| 2016/0262154 A1 | 9/2016 | Alsohaily et al. | |
| 2017/0142742 A1 | 5/2017 | Fischer et al. | |
| 2017/0201909 A1* | 7/2017 | Kobayashi | H04W 28/18 |
| 2019/0059021 A1* | 2/2019 | Corroy | H04W 36/22 |
| 2019/0102676 A1 | 4/2019 | Nazari et al. | |
| 2019/0253920 A1* | 8/2019 | Zhang | H04W 16/14 |
| 2020/0260455 A1* | 8/2020 | Jeon | H04W 72/21 |

FOREIGN PATENT DOCUMENTS

| | | |
|---|---|---|
| CN | 108141412 A | 6/2018 |
| CN | 108353460 A | 7/2018 |
| CN | 109 195 135 A | 1/2019 |
| CN | 109845310 A | 6/2019 |
| EP | 2 549 819 A1 | 1/2013 |
| EP | 2 837 110 A1 | 2/2015 |
| WO | WO 2013/155373 A1 | 10/2013 |

OTHER PUBLICATIONS

International Search Report and Written Opinion dated Jun. 26, 2020 corresponding to International Patent Application No. PCT/US2019/040574.

International Search Report and Written Opinion dated Jan. 30, 2020 corresponding to International Patent Application No. PCT/US2019/031364.

Enrique R. Bastidas-Puga et al., "Evaluation of SINR Prediction in Cellular Networks," Autonomous University of Baja California, ResearchGate, Article in IETE Technical Review, Jun. 2017.

Nils Morozs, "Accelerating Reinforcement Learning for Dynamic Spectrum Access in Cognitive Wireless Networks," Ph.D., University of York, Sep. 2015.

Sameh Musleh et al., "Load Balancing Models based on Reinforcement Learning for Self-Optimized Macro-Femto LTEAdvanced Heterogeneous Network," ResearchGate, Faculty of Engineering and Built Environment, Jul. 2017.

Nemanja Vucevic et al., "Joint Radio Resource Management for LTE-UMTS Coexistence Scenarios," IEEE, 2009.

Hui Wang et al., "Performance Study of Uplink and Downlink Splitting in Ultradense Highly Loaded Networks," Research Article, Tongji University, Wireless Communications and Mobile Computing, 2018.

Mu Yan et al., "Multi-RAT Access Based on Multi-Agent Reinforcement Learning," ResearchGate, University of Electronic Science and Technology of China, Conference Paper, Dec. 2017.

Chinese Office Action issued in corresponding Chinese Patent Application No. 201980099638.6 on May 6, 2024.

Chinese Office Action issued in corresponding Chinese Patent Application No. 2019800996386 on Nov. 30, 2024.

European Office Action issued in corresponding European Patent Application No. 19745859.9-1206 on Dec. 8, 2025.

* cited by examiner

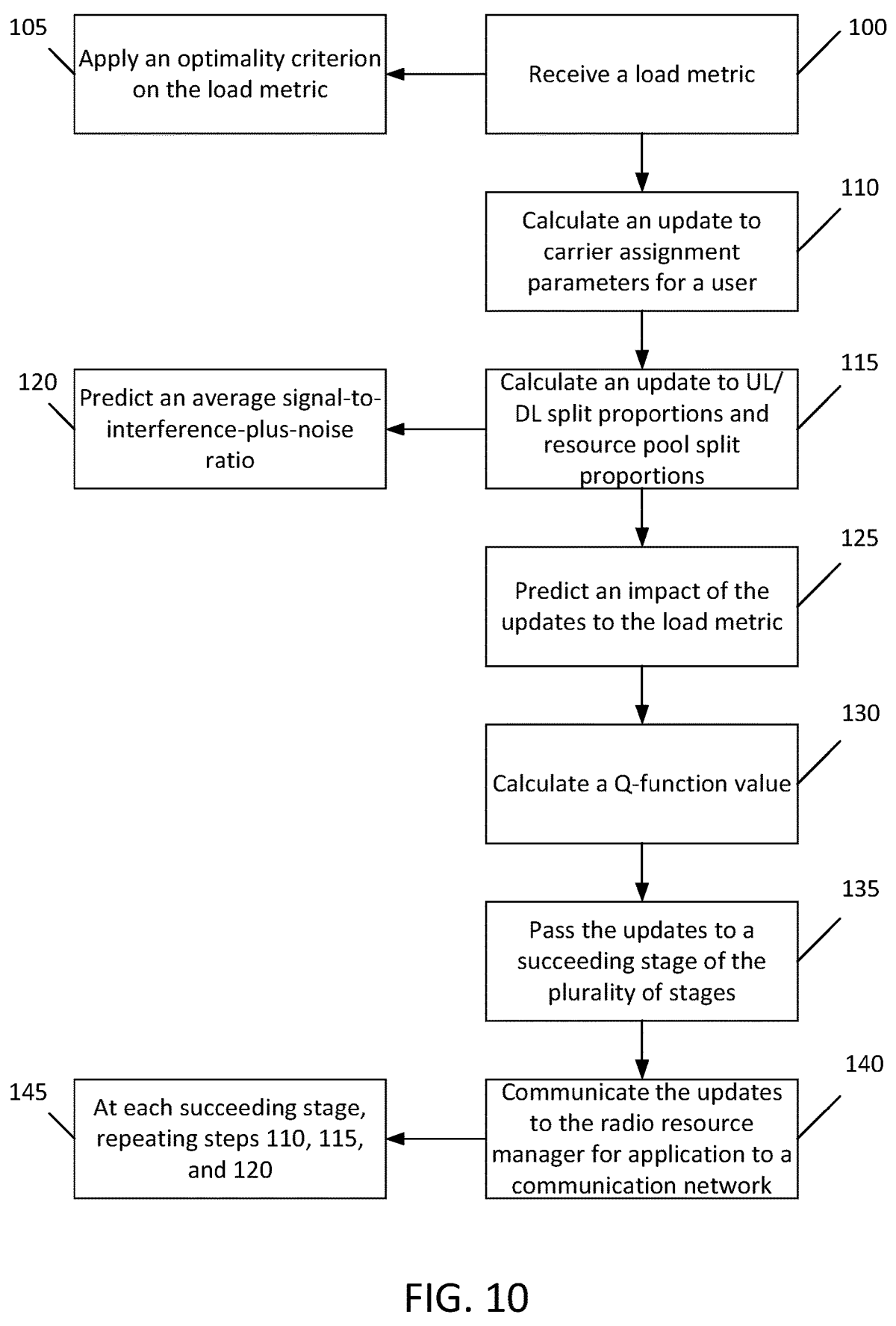

105 — Apply an optimality criterion on the load metric

100 — Receive a load metric

110 — Calculate an update to carrier assignment parameters for a user

120 — Predict an average signal-to-interference-plus-noise ratio

115 — Calculate an update to UL/DL split proportions and resource pool split proportions 125 — Predict an impact of the updates to the load metric 130 — Calculate a Q-function value 135 — Pass the updates to a succeeding stage of the plurality of stages 140 — Communicate the updates to the radio resource manager for application to a communication network 145 — At each succeeding stage, repeating steps 110, 115, and 120

FIG. 10

Send a load metric to a reinforcement learning load balancer 200

Receive updated carrier assignment parameters, updated UL/DL split proportions, and updated resource pool split proportions 205

Apply the updated carrier assignment parameters, the updated UL/DL split proportions, and the updated resource pool split proportions 210

REINFORCEMENT LEARNING BASED INTER-RADIO ACCESS TECHNOLOGY LOAD BALANCING UNDER MULTI-CARRIER DYNAMIC SPECTRUM SHARING

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for reinforcement learning based inter-radio access technology load balancing under multi-carrier dynamic spectrum sharing context.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

One embodiment may be directed to a method. The method may include receiving, at a reinforcement learning load balancer, a load metric related to available resources of a carrier. The method may also include calculating, based on the load metric, an update to carrier assignment parameters for a user. The method may further include calculating, based on the load metric, an update to uplink/downlink split proportions and resource pool split proportions. In addition, the method may include predicting an impact of the update to the carrier assignment parameters, the update to the uplink/downlink split proportions, and the update to the resource pool split proportions to the load metric. Further, the method may include communicating the update to carrier assignment parameters, the update to uplink/downlink split proportions, and the update to resource pool split proportions to one or more radio resource managers of corresponding one or more radio access technologies for application to a communication network.

Another example embodiment may be directed to an apparatus. The apparatus may include means for receiving, at a reinforcement learning load balancer, a load metric related to available resources of a carrier. The apparatus may also include means for calculating, based on the load metric, an update to carrier assignment parameters for a user. The apparatus may further include means for calculating, based on the load metric, an update to uplink/downlink split proportions and resource pool split proportions. In addition, the apparatus may include means for predicting an impact of the update to the carrier assignment parameters, the update to the uplink/downlink split proportions, and the update to the resource pool split proportions to the load metric. Further, the apparatus may include means for communicating the update to carrier assignment parameters, the update to uplink/downlink split proportions, and the update to resource pool split proportions to one or more radio resource managers of corresponding one or more radio access technologies for application to a communication network.

Another example embodiment may be directed to an apparatus which may include at least one processor and at least one memory including computer program code. The at least one memory and the computer program code may be configured to, with the at least one processor, cause the apparatus at least to receive, from a radio resource manager, a load metric related to available resources of a carrier. The apparatus may also be caused to calculate, based on the load metric, an update to carrier assignment parameters for a user. In addition, the apparatus may be caused to calculate, based on the load metric, an update to uplink/downlink split proportions and resource pool split proportions. The apparatus may further be caused to predict an impact of the update to the carrier assignment parameters, the update to the uplink/downlink split proportions, and the update to the resource pool split proportions to the load metric. In addition, the apparatus may be caused to communicate the update to carrier assignment parameters, the update to uplink/downlink split proportions, and the update to resource pool split proportions to one or more radio resource managers of corresponding one or more radio access technologies for application to a communication network.

In accordance with some example embodiments, a non-transitory computer readable medium can be encoded with instructions that may, when executed in hardware, perform a method. The method may include receiving, at a reinforcement learning load balancer, a load metric related to available resources of a carrier. The method may also include calculating, based on the load metric, an update to carrier assignment parameters for a user. The method may further include calculating, based on the load metric, an update to uplink/downlink split proportions and resource pool split proportions. In addition, the method may include predicting an impact of the update to the carrier assignment parameters, the update to the uplink/downlink split proportions, and the update to the resource pool split proportions to the load metric. Further, the method may include communicating the update to carrier assignment parameters, the update to uplink/downlink split proportions, and the update to resource pool split proportions to one or more radio resource managers of corresponding one or more radio access technologies for application to a communication network.

In accordance with some example embodiments, a computer program product may perform a method. The method may include receiving, at a reinforcement learning load balancer, a load metric related to available resources of a carrier. The method may also include calculating, based on the load metric, an update to carrier assignment parameters for a user. The method may further include calculating, based on the load metric, an update to uplink/downlink split proportions and resource pool split proportions. In addition, the method may include predicting an impact of the update to the carrier assignment parameters, the update to the uplink/downlink split proportions, and the update to the resource pool split proportions to the load metric. Further, the method may include communicating the update to carrier assignment parameters, the update to uplink/downlink split proportions, and the update to resource pool split proportions to one or more radio resource managers of corresponding one or more radio access technologies for application to a communication network.

In accordance with some example embodiments, an apparatus may include circuitry configured to receive, from a radio resource manager, a load metric related to available resources of a carrier. The apparatus may also include circuitry configured to calculate, based on the load metric, an update to carrier assignment parameters for a user. The apparatus may further include circuitry configured to calculate, based on the load metric, an update to uplink/downlink split proportions and resource pool split proportions. The apparatus may also include circuitry configured to predict an impact of the update to the carrier assignment parameters, the update to the uplink/downlink split proportions, and the update to the resource pool split proportions to the load metric. In addition, the apparatus may include circuitry configured to communicate the update to carrier assignment parameters, the update to uplink/downlink split proportions, and the update to resource pool split proportions to one or more radio resource managers corresponding to one or more radio access technologies for application to a communication network.

In accordance with some example embodiments, a method may include sending, from a radio resource manager, a load metric related to available resources of a carrier. The method may also include receiving updated carrier assignment parameters, updated uplink/downlink split proportions, and updated resource pool split proportions. The method may further include applying the updated carrier assignment parameters, the updated uplink/downlink split proportions, and the updated resource pool split proportions to a communication network.

In accordance with some example embodiments, an apparatus may include means for sending, from a radio resource manager, a load metric related to available resources of a carrier. The apparatus may also include means for receiving updated carrier assignment parameters, updated uplink/downlink split proportions, and updated resource pool split proportions. In addition, the method may include means for applying the updated carrier assignment parameters, the updated uplink/downlink split proportions, and the updated resource pool split proportions to a communication network.

In accordance with some example embodiments, an apparatus may include at least one processor and at least one memory including computer program code. The at least one memory and the computer program code may be configured to, with the at least one processor, cause the apparatus at least to send, to a reinforcement learning load balancer, a load metric related to available resources of a carrier. The apparatus may also be caused to receive updated carrier assignment parameters, updated uplink/downlink split proportions, and updated resource pool split proportions. The apparatus may further be caused to apply the updated carrier assignment parameters, the updated uplink/downlink split proportions, and the updated resource pool split proportions to a communication network.

In accordance with some example embodiments, a non-transitory computer readable medium can be encoded with instructions that may, when executed in hardware, perform a method. The method may include sending, from a radio resource manager, a load metric related to available resources of a carrier. The method may also include receiving updated carrier assignment parameters, updated uplink/downlink split proportions, and updated resource pool split proportions. The method may further include applying the updated carrier assignment parameters, the updated uplink/downlink split proportions, and the updated resource pool split proportions to a communication network.

In accordance with some example embodiments, a computer program product may perform a method. The method may include sending, from a radio resource manager, a load metric related to available resources of a carrier. The method may also include receiving updated carrier assignment parameters, updated uplink/downlink split proportions, and updated resource pool split proportions. The method may further include applying the updated carrier assignment parameters, the updated uplink/downlink split proportions, and the updated resource pool split proportions to a communication network.

In accordance with some embodiments, an apparatus may include circuitry configured to send, to a reinforcement learning load balancer, a load metric related to available resources of a carrier. The apparatus may also include circuitry configured to receive updated carrier assignment parameters, updated uplink/downlink split proportions, and updated resource pool split proportions. The apparatus may further include circuitry configured to apply the updated carrier assignment parameters, the updated uplink/downlink split proportions, and the updated resource pool split proportions to a communication network.

BRIEF DESCRIPTION OF THE DRAWINGS

For proper understanding of example embodiments, reference should be made to the accompanying drawings, wherein:

FIG. 10 illustrates an example flow diagram of a method, according to an example embodiment.

DETAILED DESCRIPTION

Figure 1:
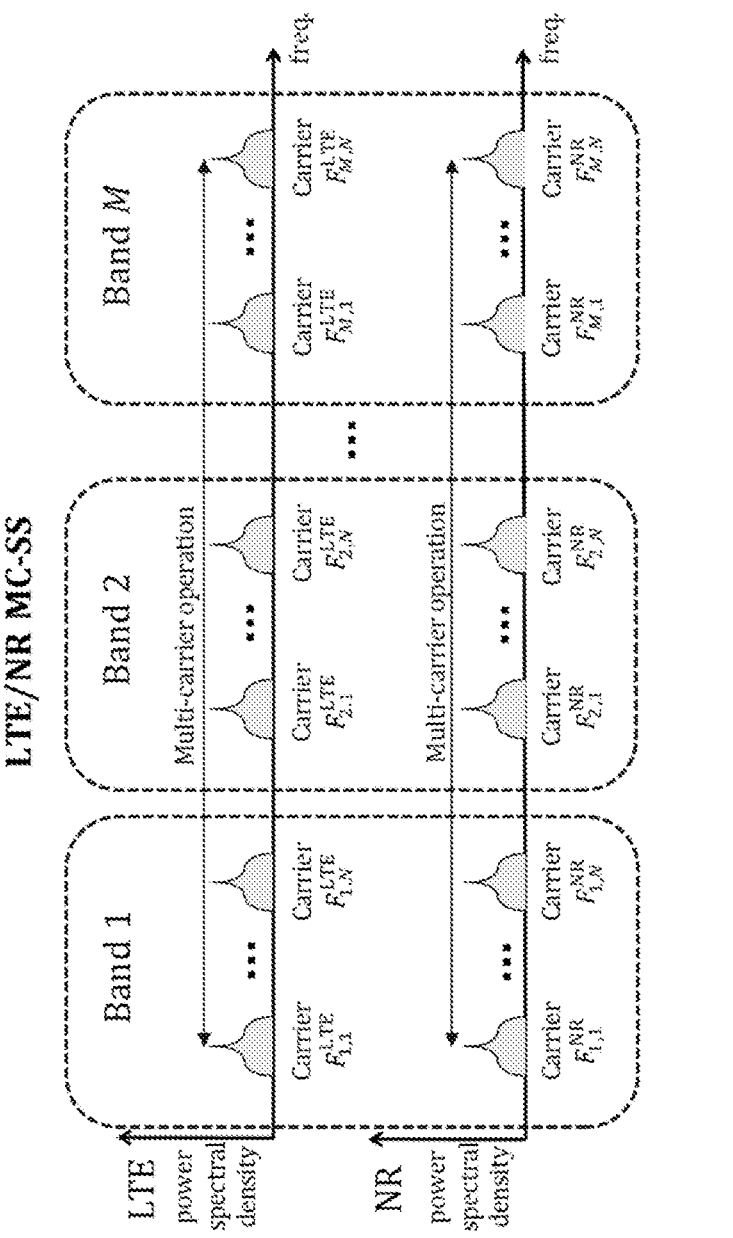
FIG. 1 illustrates a case of Long-Term Evolution and New Radio coexistence in multi-carrier spectrum sharing.

It will be readily understood that the components of certain example embodiments, as generally described and illustrated in the figures herein, may be arranged and designed in a wide variety of different configurations. Thus, the following is a detailed description of some example embodiments of systems, methods, apparatuses, and computer program products for reinforcement learning (RL) based inter-radio access technology (inter-RAT) load balancing under multi-carrier dynamic spectrum sharing (SS) context.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz— cmWav-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local breakout and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), and critical communications (autonomous vehicles, traffic safety, real-time analytics, time-critical control, healthcare applications).

5G-NR has been specified within the $3^{rd}$ Generation Partnership Project (3GPP) to be able to coexist with 4G-LTE within the same spectrum. The ability to coexist in the same spectrum (i.e., spectrum sharing) may be desirable to radio access network (RAN) operators to save valuable spectrum resources while supporting multiple radio access technologies (RATs) under the same cellular footprint. In addition, the coexistence may occur over multiple carriers in multiple bands.

For instance, FIG. 1 illustrates a case of LTE and NR coexistence in multi-carrier spectrum sharing. As the offered data load of both RATs vary over time, the shared radio resources must be used efficiently by the wireless system operator of both RATs. This may be accomplished through either an inter-RAT load balancer (LB) or through an inter-RAT-common scheduler (CS), wherein both LB and CS may use the same throughput-maximizing or proportionally-fair-metric-maximizing framework, but at different time scales. In addition, an inter-RAT CS may offer performance benefits over LB since it may exploit subframe or slot-level fluctuations in load, but at a complexity penalty because of the synchronized multi-RAT operation needed for CS. CS not only increases complexity, but also requires low-latency information exchange and, thus, is only applicable to a "single-RAN" solution. Thus, the LB may be a feasible solution for dynamic spectrum sharing (DSS) at the onset of coexistent NR-LTE deployments.

One advantage of 5G-NR over 4G-LTE is that only NR can support extremely wide single-carrier-bandwidth (e.g., 100 MHz) carriers, allowing for much larger throughputs. Typically, the high bandwidth carriers are at high frequency channels/band (HFB) (e.g., frequency region 2 (FR2): above 6 GHz, or frequency region 1 (FR1): between 3-6 GHz), in contrast with the low-frequency-band (LFB) (e.g., FR1: below 6 GHz, or low FR1: below 3 GHz) that generally has low bandwidth. However, at the HFB, the cell coverage is smaller due to the high penetration loss at such high frequency.

Both (wide bandwidth and small cell coverage) will cause the HFB frequency resource to be severely under-utilized in comparison with LFB. Generally, there is a large (up to 13 dB) downlink (DL) and uplink (UL) coverage gap due to the low UL transmission (Tx) power (relative to DL). In many cases, multi-carrier operation (coupling) is done between LFB and HFB carriers to mitigate such imbalance between HFB and LFB, and support improved coverage, mobility, and reliability for HFB.

It may be beneficial to perform multi-carrier (MC) operation for NR wherein at least one of the aggregated carriers is at the HFB (for improved throughput), and at least one is at the LFB (for improved coverage). However, in certain cases, the LFB may already be saturated with LTE carriers when NR is deployed. Through MC-SS, LFB resources may be utilized together with the HFB carrier for new 5G users, while maintaining the same LFB resources to support pre-existing LTE users. Certain example embodiments may provide solutions to equitably share both the spectrum and time resources to UEs of both RATs and over multiple carriers.

Further, certain example embodiments may define a reinforcement learning (RL) algorithm for unified load balancing (LB) that handles both spectrum sharing (between LTE and NR) and LFB-HFB coupling (within NR). This is in addition to the existing LB among carriers within LTE and within NR, and uplink (UL)/downlink (DL) split if a time division duplex (TDD) frame configuration is used. It may also be applicable to a network with a frequency division duplex (FDD) frame configuration.

Figure 2:
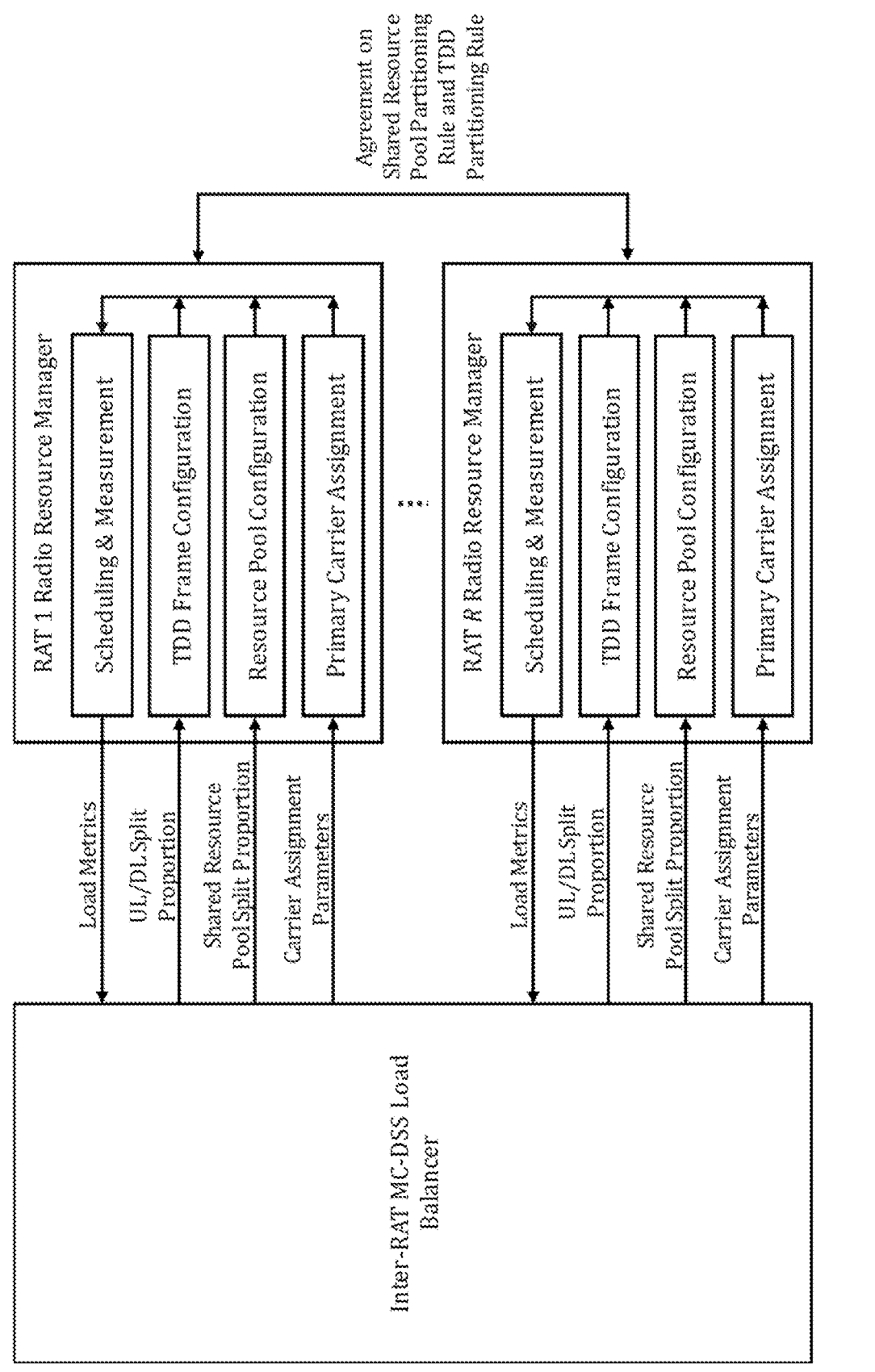
FIG. 2 illustrates an inter-radio access technology (RAT) load balancer input/output relationship to RAT radio resource managers (RRMs).

Previously, there has been provided solutions for inter-RAT load balancing of MC-DSS (MC-DSS LB), in an effort to maximize user throughputs and improve reliability by iteratively and equitably adjusting the 1) receive signal strength (RSS) or power headroom (PHR) thresholds and target assignment proportions for primary carrier assignment, 2) the partitioning of shared resource pools, and 3) the TDD frame configuration. All three may dynamically update based on each scheduler's load metrics (LMs) to balance both links. Its input/output relation to the RAT radio resource managers (RRM) is illustrated in FIG. 2.

In the past, shared radio-frequency resources have been split into orthogonal (i.e., non-co-interfering) resource pools, where each RAT is assigned a resource pool. The resource pool is an aggregation of segments of time and frequency that is for exclusive use of a RAT and not any other. The LB adjusts the proportion of each resource pool based on the relative offered data load of each RAT at each carrier. After the resource pool proportion is determined by the LB, scheduling of UEs may be done by each RAT network for its pool resource pool, independently. In addition, the LB assigns UEs to their appropriate primary carriers considering the intra-RAT and inter-RAT load on those carriers. Moreover, for a system with one or more carriers that use a TDD frame configuration, the LB calculates the TDD UL/DL split proportion considering the utilization of the resource pools of multiple RATs at each carrier.

The RATs may have an agreement on how to partition the shared resource pool among themselves so that when they receive their corresponding resource pool split portion from the LB, orthogonality between the RP partitions is ensured. Furthermore, the RATs may have an agreement on how to partition the TDD frame configuration so that when the UL/DL split proportion is decided by the LB, the UL and DL transmissions across RATs would be synchronized. The partitioning rules for the RP and TDD may be determined by one of the RRMs or by another entity such as the LB.

MC-DSS LB operation may be characterized in terms of a three-loop architecture. For example, the LB scheme may iteratively optimize the resource split and user assignments across multiple RATs, links (i.e., UL/DL), bands, and carriers using a common load metric. The scheme may also yield maximized total log throughputs or equalized utilization of resources across all RATs, links, bands, and carriers.

Figure 3:
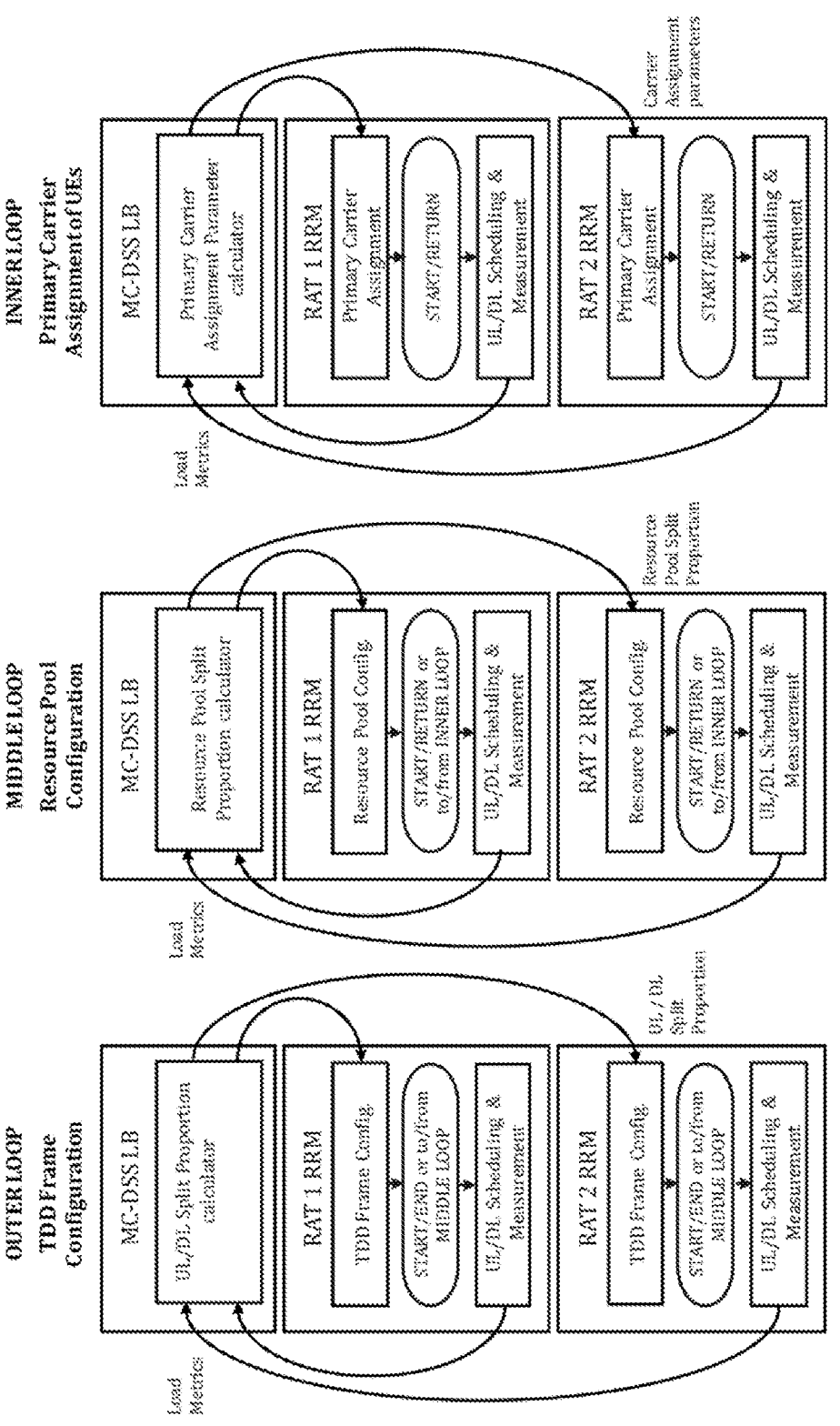
FIG. 3 illustrates an example iterative multi-carrier dynamic spectrum sharing (MC-DSS) load balancing (LB) operation.

FIG. 3 illustrates an example iterative multi-carrier dynamic spectrum sharing (MC-DSS) load balancing (LB) operation. As illustrated in FIG. 3, the iterative operation includes an outer loop of a TDD frame configuration, a middle loop of a resource pool configuration, and an inner loop of a primary carrier assignment of UEs.

In the outer loop, after some scheduling period or after being triggered, the scheduler of each cell may measure and pass load metrics to the LB. With the load metrics, LB may then calculate the UL/DL split proportions based on the combined reported load metrics of one or more cells. The LB may also pass the split proportion to the TDD Frame Configuration of each cell, which then applies the split proportion. Once each cell applies the split proportion, the middle loop may be performed, and the procedures of the outer loop may be repeated infinitely.

In the middle loop, after some scheduling period or after being triggered, the scheduler may measure and pass load metrics to the LB. With the load metrics, the LB may calculate the resource pool split proportions of each RAT for one or more cells. In addition, the LB may pass the split proportion to the Resource Pool Configuration, which then applies the split proportion. Once each cell applies the split proportion, the inner loop may be performed, and the procedures of the middle loop may be repeated for a few iterations such as, for example, one or more iterations. One iteration may include the measurement of the load metrics, calculation of the configuration parameter, and application of the configuration parameter.

In the inner loop, after some scheduling period or after being triggered, the scheduler may measure and pass load metrics to the LB. For one or more cells, the LB may calculate the target number of UE proportions of each carrier and receive signal strength (RSS) thresholds of each band. In an example embodiment, the number of UE proportions for each carrier may be based on the size of the resource pool of each carrier. In addition, the RSS thresholds may aim to equitably appropriate UEs to different bands while ensuring that the coverage of each band (based on the type of MC operation) is not exceeded.

In the inner loop, the calculated target UE proportions and RSS thresholds may be passed on to the primary carrier assignment (PCA) after the LB calculates the target number of UE proportions of each carrier and RSS thresholds of each band. The PCA may then apportion the UEs based on the target proportions per carrier and the RSS thresholds per band. Following the apportions, scheduling may be performed by the cell. As with the outer and middle loops, the procedures of the inner loop may be repeated a few iterations, and the process may return to the middle loop.

As illustrated in FIG. 3, the procedure is an iterative closed-form procedure wherein the frame configuration, resource pool configuration, and primary carrier assignment is performed sequentially. As such, its convergence to the optimum load balance is slow. Moreover, since this procedure is reactionary to historic load, it does not offer the capability of load balancing towards predicted future load, which may be different from the historic load. Thus, according to certain example embodiments, an RL algorithm may be provided, which jointly calculates and applies the optimized frame configuration, resource pool configuration, and primary carrier assignment based on both historic load and predicted future load. In addition, the algorithm may incorporate into the RL models the signal-to-interference-plus-noise ratio (SINR), RSS, and PHR distributions. These may aid in performing per-user carrier assignment decisions, which impact future load. Further, because of the capability to perform optimized one-shot joint update of multiple LB configuration parameters through RL, certain example embodiments may achieve optimized load balancing faster and more accurately than the previous procedures described above.

Figure 4:
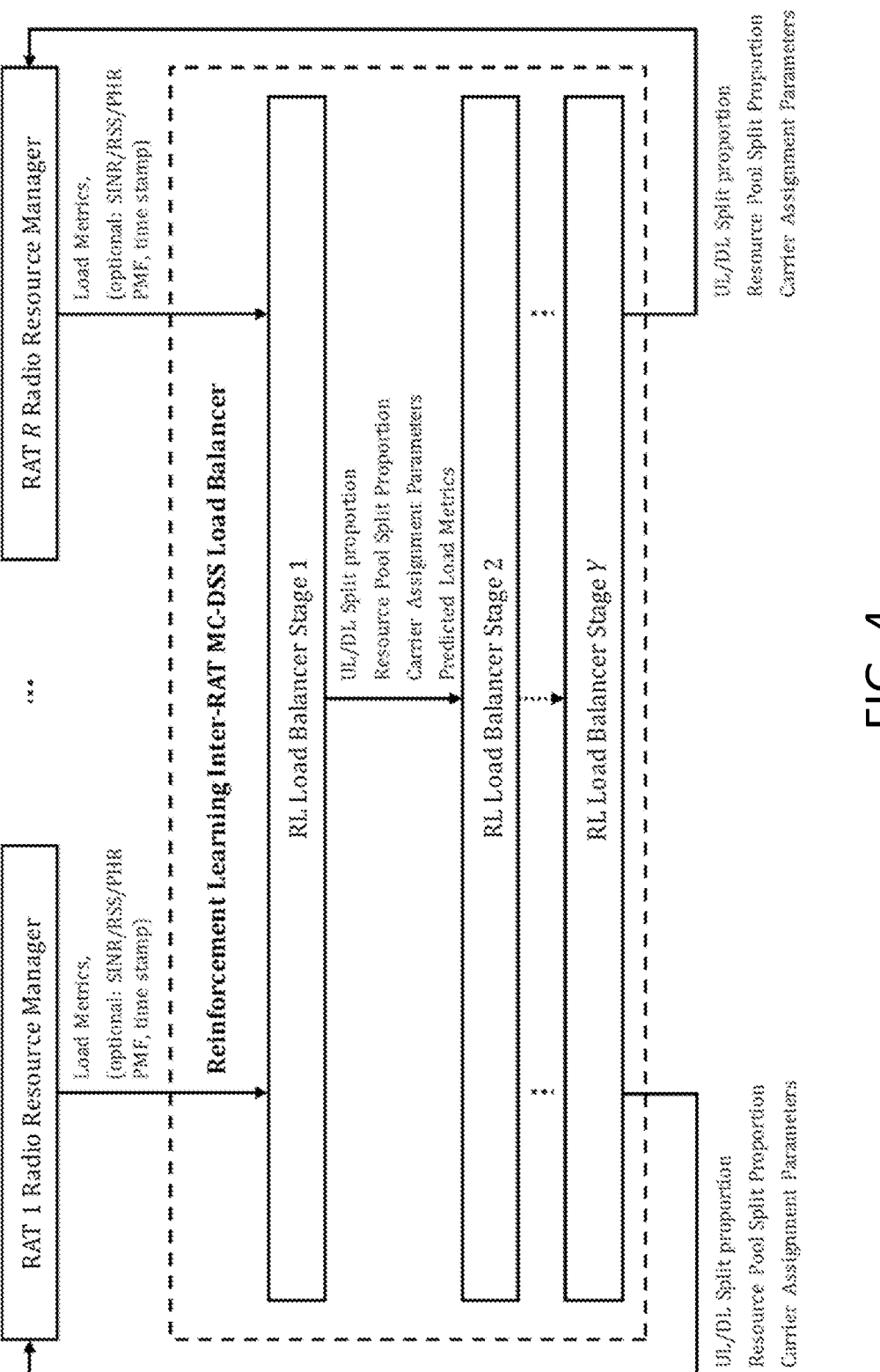
FIG. 4 illustrates an example of a reinforcement learning (RL) inter-RAT MC-DSS load balancer operation, according to an example embodiment.
Figure 5:
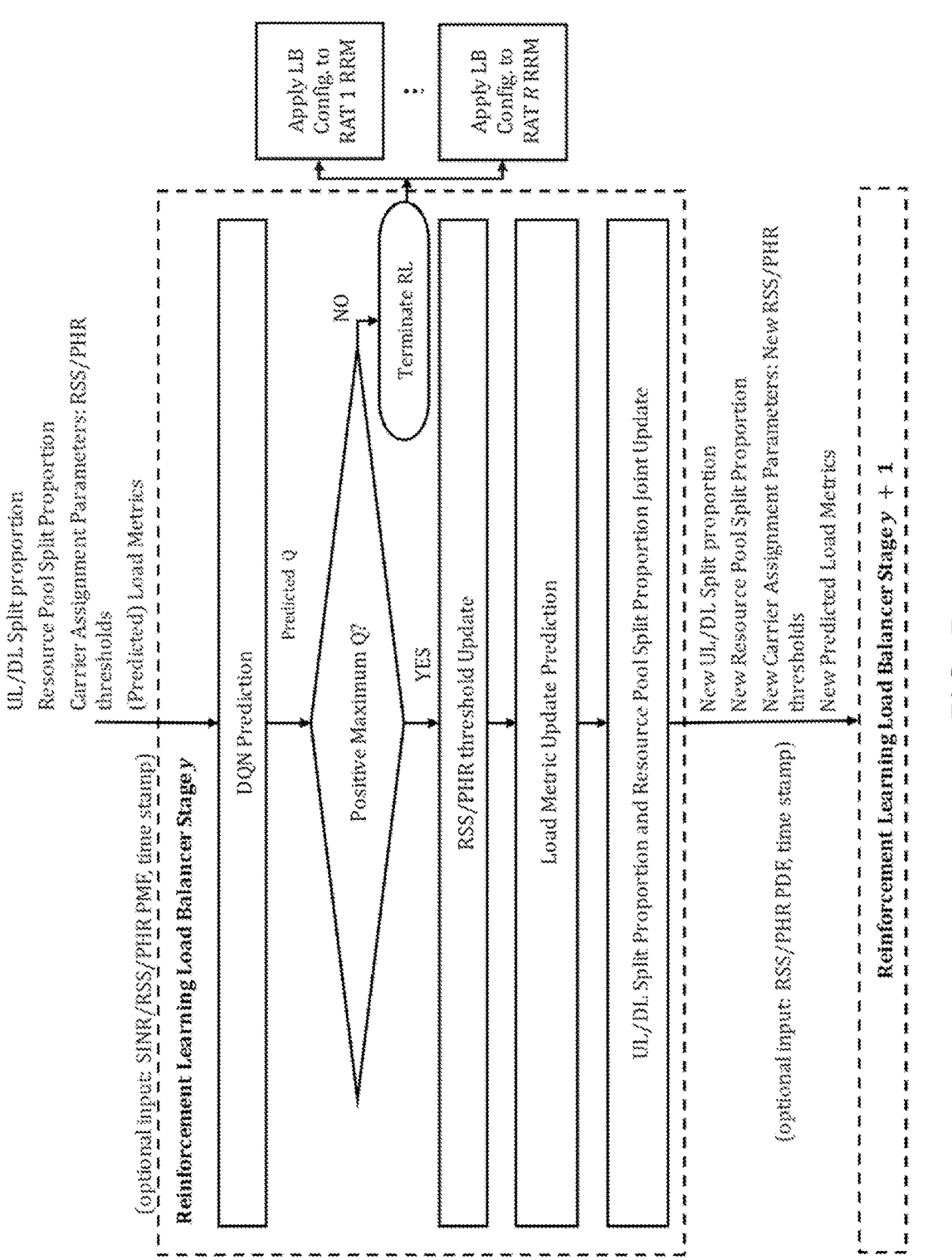
FIG. 5 illustrates an example of a RL learning load balancer stage operation, according to an example embodiment.

FIG. 4 illustrates an example of a RL inter-RAT MC-DSS load balancer operation, according to an example embodiment. According to an example embodiment, an RL load balancer may be composed of several stages, as illustrated in FIG. 4. Further, FIG. 5 illustrates an example of a RL learning load balancer stage operation, according to an example embodiment. Here, each stage may calculate a potential update to the carrier assignment parameters, and split proportions and predict the impact of those changes on the load metrics and overall load balance. A positive impact of a change in carrier assignment configuration by the stage on the overall load balance is indicated by a positive Bellman Equation Q-function value, calculated by a Deep Q Network (DQN). Further, the RL load balancer may use a Q-function value, which when maximized, may lead to a maximized geometric mean of user throughputs across all carriers, bands, RATs, and links.

Additionally, the change in load metrics by a change in carrier assignment configuration may be predicted by a Deep Neural Network (DNN). As illustrated in FIG. 5, the UL/DL split proportion and resource pool split proportions may be calculated from the updated load metrics using closed form equations. If a positive maximum Q function value is predicted, then the predicted load metrics and configuration parameters may be passed on to a succeeding stage. Otherwise, the RL procedure may terminate and the calculated configuration parameters of the prior stage may be passed on and applied to their respective RRMs.

A description of load metric formulation is described herein. The load balancing scheme may be formulated based on the load at each RAT/carrier/link combination. For example, in certain embodiments, the LM of a DL/UL link of a cell on the carrier may be formulated as either an average cell proportionally fair metric (ACPF) for the link or the cell's averaged resource pool share utilization (ARPSU). In an example embodiment, the LM for the DL cell or UL cell at the carrier may be denoted as n (n=1, . . . , N) of band m (m=1, . . . , M) of RAT r (r=1, . . . , R) as $$L_{r,m,n}^{DL} \text{ or } L_{r,m,n}^{UL},$$

respectively.

In the first LM option of ACPF, most packet schedules of RATs may use proportionally fair (PF) queuing in assigning users in the time and frequency domain. Further, the downlink PF metric of user u for the kth time-frequency-code-space resource for carrier [r, m, n] may be given by:

$$\rho_{r,m,n}^{DL,u,k} = q_u \frac{T_{r,m,n}^{DL,u,k}}{T_{r,m,n}^{DL,u}}, \tag{1}$$

where $$T_{r,m,n}^{DL,u,k}$$

is the achievable DL instantaneous throughput of the uth user at the kth resource of carrier [r, m, n], and $$T_{r,m,n}^{DL,u,}$$

is the averaged downlink throughput of the uth user of carrier [r, m, n] which may consider the ACK/NACK feedback of transmissions. In addition, $q_u$ ($q_u > 0$) is a quality-of-service (QoS) weighting factor which is based on the type of carried traffic and retransmission number. The instantaneous throughput may depend on the receive signal-to-interference-plus-noise-ratio (SINR), multiple-input multiple-output (MIMO) rank, and data buffer size of the user. Moreover, the SINR may consider the receiver noise floor, the inter-cell interference, multi-user-MIMO cross-beam interference, and non-orthogonal multiple-access (NOMA) interference.

The uplink PF metric $$\left( \rho_{r,m,n}^{UL,u,k} \right)$$

may be similarly formulated. Further, according to another example embodiment, for ACPF, the downlink LM for the carrier [r, m, n] may be formulated as:

$$L_{r,m,n}^{DL} = L_{r,m,n}^{DL,ACPF} = g_{r,m,n}^{DL} E \left( \sum_{k=1}^{K_{r,m,n}^{DL}} \sum_{u}^{U_{r,m,n}^{DL}} v_{u,k}^{DL} \rho_{r,m,n}^{DL,u,k} \right), \tag{2}$$

where $$K_{r,m,n}^{DL}$$

is the total number of resources for the part of the pool assigned for the rth RAT, $$U_{r,m,n}^{DL}$$

is the total number of downlink users, and $$v_{u,k}^{DL} \in \{0, 1\}$$

is the user selection indicator for the uth-kth user-resource pair, and E( ) is a sample averaging function which can be across samples in time or across a group of cells or both. In an example embodiment, the sample averaging function may be implemented through a discrete time filter. In addition, the LB may use a filter with a different correlation time for the E( ) of each stage of the LM scheme, depending on the update period of each stage. The term $$g_{r,m,n}^{DL} \text{ (where } g_{r,m,n}^{DL} > 0)$$

11 is a carrier-specific load multiplier to optionally provide prioritization across carriers. The prioritization may be used to scale for different target user or cell throughputs across links, carriers, and bands or for other reasons.

For the single-user MIMO case with PF scheduling, the user selection indicator may be formulated as:

$$v_{u,k}^{DL} = \begin{cases} 1 & \text{for } \rho_{r,m,n}^{DL,u,k} = \max_u \rho_{r,m,n}^{DL,u,k} \\ 0, & \text{otherwise} \end{cases} \tag{3}$$

where selecting the PF-maximizing user for the resource is known as "cherry-picking." The uplink LM $$C_{r,m,n}^{UL,ACPF}$$

may be similarly formulated. For multi-user MIMO, $$v_{u,k}^{DL} = 1$$

for one or more users of the kth resource.

At higher data traffic loads, a data queue may start to build up at the buffer which would lead to a higher maximum PF metric. Thus, it is possible to use the PF metric as a measure of load, especially at higher loads.

As a second LM option, ARPSU may formulate the downlink LM as follows:

$$L_{r,m,n}^{DL} = L_{r,m,n}^{DL,ARPSU} = g_{r,m,n}^{DL} E\left( \sum_{k=1}^{K_{r,m,n}^{DL}} z_k^{DL} \right), \tag{4}$$

where $$z_k^{DL} \in \{0, 1\}$$

is the resource selection indicator for the kth resource of the pool and $$d_{u,k}^{DL}$$

is the amount of remaining data in the buffer. The fractional term represents the predicted amount of resources needed to drain the remaining data in the buffer, and $p \in \{0,1\}$ is an activation/deactivation parameter for the fractional term. In an example embodiment, the uplink LM $$L_{r,m,n}^{UL,ARPSU}$$

may be similarly formulated.

By load balancing using the resource pool share utilization as the load metric, the utilization of shared resources may be equalized across all RATs and all carriers. However, since the ARPSU's value is limited to be between 0% and 100% of all resources for the carrier (provided that $$g_{r,m,n}^{DL} \le 1),$$

load balancing using the ARPSU metric is not able to handle the load balancing for full-buffer or near-full-buffer traffic scenarios. On the other hand, load balancing using the ACPF metric incorporates QoS prioritization and is able to handle full-buffer-scenarios, which the ARPSU does not. However, load balancing using the ARPSU is simpler than through the ACPF and may be sufficient at lower or medium traffic loads.

In an example embodiment, a third LM option, total average resource requirement (TARR) may consider both the historic amount of utilized resources and the predicted amount of additional resources for the data remaining in the buffer. The DL LM may be formulated as:

$$\begin{aligned} L_{r,m,n}^{DL} &= L_{r,m,n}^{DL,TARR} \\ &= g_{r,m,n}^{DL} E\left( \sum_{k=1}^{K_{r,m,n}^{DL}} z_k^{DL} + \frac{\sum_u^{U_{r,m,n}^{DL}} d_{u,k}^{DL}}{\sum_{k=1}^{K_{r,m,n}^{DL}} \sum_u^{U_{r,m,n}^{DL}} v_{u,k}^{DL} T_{r,m,n}^{DL,u}} \right), \end{aligned} \tag{5}$$

where $$d_{u,k}^{DL}$$

is the amount of remaining data in the buffer. The fractional term represents the predicted amount of resources needed to drain the remaining data in the buffer.

According to an example embodiment, an optimality formulation may be provided for load balancing. For instance, an optimality criterion for MC-SS LB may optimize the total log throughput of all RATs. According to an example embodiment, the optimality criterion may incorporate the load metrics across links, carriers, bands, and RATs. It may also incorporate the constraints on the resource pool proportions and the carrier assignment thresholds, and it may be used to evaluate the reward component of the Q function.

The load metric is essentially a measure of congestion of how much buffered data or number of active users are contesting for the available resources of a carrier. Therefore, a suitable function for load balancing performance may be the assignment of resources and users. This may maximize the per-user log throughput as a function of the load metric and the allocated resources to carriers. In an example embodiment, the optimality formulation for the load balance metric F is detailed in equation (6) below.

(6)

(6a)

$$\underset{\substack{K_{r,m,n}^l \\ S_{r,m}^l \\ \forall l, \forall r, \forall m, \forall n}}{\text{maximize}} F\left(K_{r,m,n}^l, S_{r,m}^l\right): F =$$

$$\sum_{l=1}^{\Lambda} \sum_{r=1}^{R} \sum_{m=1}^{M} \sum_{n=1}^{N} L_{r,m,n}^l \left(S_{r,m}^l\right) \log \frac{K_{r,m,n}^l}{L_{r,m,n}^l\left(S_{r,m}^l\right)}$$

-continued $$K_{r,m,n}^l \in \mathbb{Z}_*, \ (l = 1: UL, \ l = 2:DL) \tag{6b}$$

$$K_{r,m,n}^{l,min} \leq K_{r,m,n}^l \leq K_{r,m,n}^{l,max} \tag{6c}$$

such that $$\sum_{r=1}^R K_{r,m,n}^l = K_{total,m,n}^l \tag{6d}$$

$$\sum_{l=1}^\Lambda K_{total,m,n}^l = K_{total,m,n}^{total} \tag{6e}$$

$$S_{r,m}^{l,min} \leq S_{r,m}^l \leq S_{r,m}^{l,max}, \ S_{r,m}^l \in \mathbb{Z}_{dB} \tag{6f}$$

In equation (6), the constraints may be imposed on the minimum, maximum, and sum of the resource pool share of each carrier $$K_{r,m,n}^l.$$

In addition, minimum and maximum constraints are imposed on the RSS/PHR thresholds $$S_{r,m}^l,$$

which depends on the type of multi-carrier operation. The load metric $$L_{r,m,n}^l$$

is a function of the carrier assignments of users, which may be determined by the RSS/PHR thresholds along with the offered data traffic load.

According to an example embodiment, metrics for future convenience may be defined in terms of total load of a carrier, total load of a band, total resources of a band, total load metric $L_{total}$ as the sum of all load metrics, and the global total of the resources $K_{total}$ as the sum of all resources. These metrics are respectively shown in equations (7a)-(7e) as follows:

$$L_{total,m,n}^{total} = \sum_{l=1}^\Lambda \sum_{r=1}^R L_{r,m,n}^l. \tag{7a}$$

$$L_{total,m,total}^{total} = \sum_{n=1}^N L_{total,m,n}^{total}. \tag{7b}$$

$$K_{total,m,total}^{total} = \sum_{n=1}^N K_{total,m,n}^{total}. \tag{7c}$$

$$L_{total} = \sum_{l=1}^\Lambda \sum_{r=1}^R \sum_{m=1}^M \sum_{n=1}^N L_{r,m,n}^l \tag{7d}$$

$$K_{total} = \sum_{l=1}^\Lambda \sum_{r=1}^R \sum_{m=1}^M \sum_{n=1}^N K_{r,m,n}^l \tag{7e}$$

The quantities from equations (7a)-(7e) may be used to express the solution of the optimality problem, wherein integer constraints ($\in \mathbb{Z}$) and minimum and maximum constraints are removed. For the case where the LMs are constant and the resource pools are to be split, the function-maximizing resource allocation $$K_{r,m,n}^{l,opt}$$

may be:

$$K_{r,m,n}^{l,opt} = K_{total} \frac{L_{r,m,n}^1}{L_{total}} \forall \ r, m, n. \tag{8}$$

On the other hand, in a case where the carrier reassignments are to be performed and the number of allocated resources are fixed, the target LMs based on the allocated resources are:

$$L_{r,m,n}^{l,opt} = L_{total} \frac{K_{r,m,n}^l}{K_{total}} \forall \ r, m, n. \tag{9}$$

These solutions may maximize the sum of the log throughputs of users when the mentioned constraints are removed. However, since the integer, minimum and maximum constraints need to be considered in a real network, and the mapping of LMs from the carrier assignment threshold depends on the SINR/RSS/PHR user distribution, finding the optimum solution may be challenging. To accomplish this, certain example embodiments may use a trained DQN and DNN(s) to find the optimum configuration adjustments, and predict the changes in LMs due to the configuration adjustments.

According to an example embodiment, a multi-stage DQN may be used to find the optimized primary carrier assignment (PCA) configuration for the LB. In addition, the DQN may determine the optimized new RSS/PHR thresholds, while in-band carrier assignment probabilities may be calculated using closed-form equations. These carrier assignment parameters may then be passed to an RRM, which may assign or reassign the users to carriers that satisfy these parameters.

An example embodiment may provide an RL method wherein a DQN is used to arrive at the optimized RSS/PHR thresholds, and in-band carrier assignment probabilities. The RL method may be useful when the allowed range of update values to the RSS/PHR threshold is limited (i.e., the RSS/PHR threshold is not allowed to change dramatically) such that the optimized RSS/PHR threshold update is possibly out-of-range of the allowed updated values. Additionally, the RL method may have the ability to converge to the optimal load balance as compared to iterative RSS/PHR threshold determination. Furthermore, due to the limited range in updated values, the RL method may avoid overshooting the optimized update value (and consequently avoid overshooting the optimal load balance), which supervised learning does not address.

According to an example embodiment, the RL method may use a multi-stage model where the with stage uses a DQN to determine a mini threshold update. The threshold update to the prior RSS/PHR threshold may be the accumulation of mini updates done at each stage:

$$S_{r,m}^{l,update} = \sum_{y=1}^{Y} S_{r,m}^{l,miniupdate,y}, \tag{10}$$

where Y is the number of RL stages for a sample and the set of possible updates is small, e.g.

$$S_{r,m}^{l,miniupdate,y} \in \{-1, 0, 1\}.$$

Once the update is determined, a new RSS/PHR threshold $$\left(S_{r,m}^{l,new}\right)$$

may be obtained from the sum of the update $$\left(S_{r,m}^{l,update}\right)$$

and the prior RSS/PHR threshold $$\left(S_{r,m}^{l,new}\right):$$

$$S_{r,m}^{l,new} = S_{r,m}^{l,prior} + S_{r,m}^{l,update} \,\forall\, r, m. \tag{11}$$

A single-stage may suffice if the size of the DQN output vector is large— many quantized threshold update values is allowed. Otherwise, through mini-updates of each stage, the multi-stage model may allow for a larger number of possible quantized threshold update values while reducing the complexity of the DQN by limiting the size of the DQN's output vector.

In an example embodiment, the first band, corresponding to the lowest frequency, may have the greatest coverage among all bands, and may serve as the fallback when the other bands are out-of-coverage to a UE. As such, the threshold of the first band may be fixed to its minimum value to ensure greatest coverage:

$$S_{r,1}^{l} = S_{r,1}^{l,min},$$

while allowing a small number of possible mini updates to the thresholds of the other bands:

$$S_{r,m}^{l,miniupdate,y} = \delta \in \{\delta_1, \delta_2, \dots, \delta_\Delta\},$$

e.g. $\delta \in \{-1,0,1\}$. According to certain example embodiments, DQN models may model the set of Q-values of the Bellman equation as shown in equation (12):

$$Q(s, a) = r(s, a) + \eta \max_{a'} Q(s'(s, a), a'). \tag{12}$$

In equation (12), $\eta$ is the future discount factor ($0 < \eta \le 1$), s is the state the system is at, and a is the action taken at state s. The Q value represents a future reward that is observed when taking action a and it is equal to the sum of the immediate reward r(s, a) and potential maximum future reward $$\max_{a'} Q(s'(s, a), a')$$

of the state s' to which the system will transition assuming action $\alpha$ is taken. The Q value is the output of the DNN.

According to an example embodiment, the state s may be defined with respect to input to DQN at the vth stage as: (1) prior load Metrics $$L_{r,m,n}^{l,prior} \,\forall\, r, m, n, l;$$

(2) prior LB Configuration: (a) RSS/PHR threshold of prior DQN stage:

$$S_{r,m}^{l,prior} + \sum_{x=1}^{y-1} S_{r,m}^{l,minupdate,x} \,\forall\, r, l; m > 1;$$

(b) UL/DL Split proportion $$K_{total,m,n}^{l} \,\forall\, m, n, l$$

(optional); and (c) Resource Pool Split Proportion $$K_{r,m,n}^{l} \,\forall\, r, m, n, l$$

(optional); (3) prior $$SINR\ PMF\ \left(PMF\left(\chi_{r,m,n}^{l,prior}\right)\right)$$

for one or more r, m, n, l (optional); (4) prior $$RSS/PHR\ PMF\ \left(PMF\left(\xi_{r,m,n}^{l,prior}\right)\right)$$

for one or more r, m, n, l (optional); and (5) time stamps (optional).

In an example embodiment, the inputs may be provided from the collected measurements and configurations at one or more prior update intervals. Each set of DQN inputs for an update interval may have its own set of DQN input nodes, or the data from several update intervals may be linearly combined to produce a single set of DQN input nodes. If the set of inputs of consecutive update intervals are to be consecutively input, a recurrent neural network architecture may be beneficial in accurately predicting the outputs.

According to an example embodiment, each action a corresponds to the set of band-specific updates to RSS/PHR thresholds, and may have a corresponding Q-value. The Q-function's reward value r(s, a) is the net increase in the optimality function F of equation (5).

$$r(s, a) = F(s'(s, a)) - F(s), \qquad (13)$$

where the split proportions may be calculated through equations (14) and (15) described below.

Assuming $\eta=1$, the Q value of action $\alpha$ at the yth stage represents the remaining maximum potential increase in optimality by adding $$\sum_{x=y}^{Y} S_{r,m}^{l,minupdate,x}$$

to $$S_{r,m}^{l,prior} + \sum_{x=1}^{y-1} S_{r,m}^{l,minupdate,x}.$$

The term $$\sum_{x=y}^{Y} S_{r,m}^{l,minupdate,x}$$

considers the mini update of action $\alpha$ and future mini updates of subsequent Q-maximizing action. Further, to obtain the optimal Q-function, a value iteration (i.e., exploration/exploitation) for all states and actions may need to be conducted. The RL exploration/exploitation strategy (e.g. $\epsilon$-Greedy) during the DQN training may be left to implementation discretion.

Figure 6:
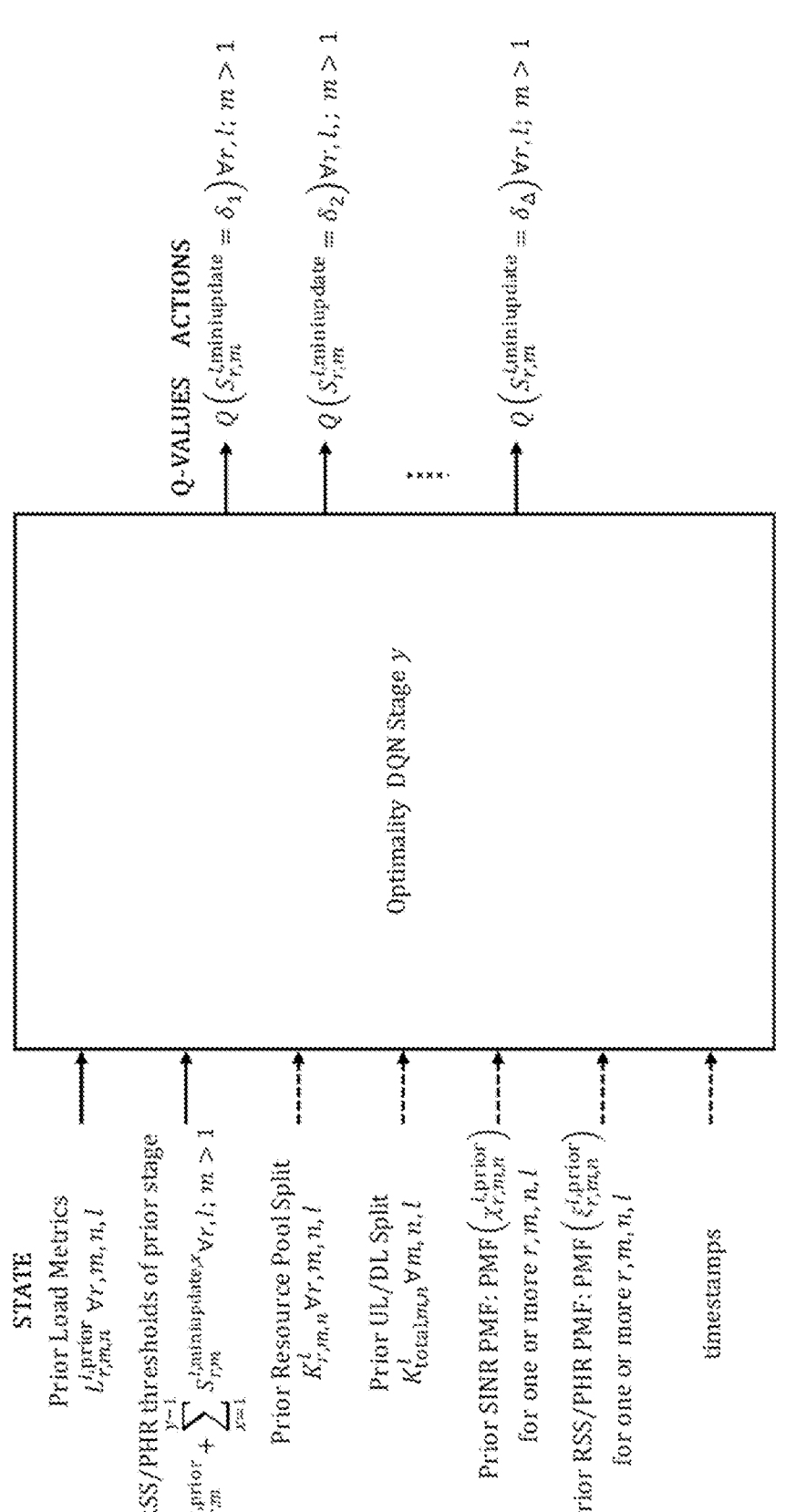
FIG. 6 illustrates an example of RL load balancer optimality Deep-Q-Network (DQN) inputs and outputs, according to an example embodiment.

FIG. 6 illustrates an example of reinforcement learning load balancer optimality DQN inputs and outputs, according to an example embodiment. As illustrates in FIG. 6, during DQN training, for large threshold updates, the update may be decomposed into smaller "mini-update" steps whose sum is the threshold update. The DQN may then be trained for each of the mini-updates, wherein their Q values are the same. The same Q value may be assigned to all the component mini-updates of all RATs (r), links (l) and bands (m) except for the first band.

According to an example embodiment, the thresholds may determine the assignment of bands to users. For example, if a user's RSS/PHR meets the band's RSS/PHR threshold, a user may be assigned to the band. The prioritization among bands that provide a sufficient threshold for a user may be based on the maximum achievable throughput of a user on the band:

$$T_{r,m}^{l,u,max} = \begin{cases} \sum_{n=1}^{N} \sum_{k=1}^{K_{r,m,n}^{l}} T_{r,m,n}^{l,u,k}\left(\chi_{r,m,n}^{l,u,predict}\right) & \text{for carrier aggregation or} \\ & \text{multi–connectivity} \\ \max_{n} T_{r,m,n}^{l,u,k}\left(\chi_{r,m,n}^{l,u,predict}\right), & \text{for independent carriers or} \\ & \textit{supp.} \text{ uplink} \end{cases} \qquad (14)$$

where $$T_{r,m,n}^{l,u,k}$$

is a per-resource throughputs which is a function of the predicted SINR of the user for the carrier $$\left(\chi_{r,m,n}^{l,u,predict}\right).$$

The number of resources $$\left(K_{r,m,n}^{l}\right)$$

may be the prior or new value as calculated from (20) and (21). The expected SINR for the user may be historic measurements or predicted values.

In an example embodiment, a higher maximum achievable user throughput on a band may give it priority over a band with lower maximum achievable user throughout. For example, higher-frequency bands that provide a sufficient threshold may provide higher maximum achievable user throughput.

According to an example embodiment, once a user is assigned to the band, it is assigned to a carrier with a probability either based on the prior LMs or new LMs as calculated by equation (19) discussed below, the total number of resources for each carrier, and the SINR for each carrier. Deciding which option to use may depend on the availability of measurements and on how fast the reconfigurations are with respect to traffic loads. A first option (Maximize User Throughput) may be preferable if carrier-specific SINR or wideband throughput is available for each user, in which case the user throughputs can be maximized. Otherwise, the next two options may be preferable. In particular, the second option (Equalize LMs) may be preferred over the third when the reconfiguration period is much shorter than the rate of change of natural fluctuations of traffic loads, while the third option (Proportional Resource Allocation) is preferred otherwise.

In an in-band carrier assignment of option 1 for maximizing user throughput, users may be assigned to the in-band carrier which may maximize each user's predicted throughput, given the current load amount of resources of a carrier. According to an example embodiment, the predicted throughput of the uth user for the carrier [r, m, n] may be $$T_{r,m,n}^{l,u,predict}:$$

$$T_{r,m,n}^{l,u,predict} = \frac{\sum_{k=1}^{K_{r,m,n}^{l}} T_{r,m,n}^{l,u,k}\left(\chi_{r,m,n}^{l,u,expected}\right)}{L_{r,m,n}^{l}}. \qquad (15)$$

The carrier assignment probability $$\left(u_{r,m,n}^{l}\right)$$

of a user to a carrier may be user-specific and taken from the maximum among all in-band carriers:

$$u_{r,m,n}^{l,u,option1} = \begin{cases} 1 & \text{for } n = \arg\max_{n} T_{r,m,n}^{l,u,predict} \\ 0, & \text{otherwise} \end{cases} \quad (16)$$

In an in-band carrier assignment of option 2, LMs may be equalized. For example, the carrier assignment probability $$\left(u_{r,m,n}^{l}\right)$$

of a user to a carrier may be complementary to the carrier's LM relative to other carriers' LMs, and may be formulated as:

$$u_{r,m,n}^{l,option2} = \begin{cases} 1 & \text{for } N = 1 \quad (17) \\ \dfrac{L_{r,m,max}^{l}+L_{r,m,min}^{l}-L_{r,m,n}^{l}}{N\left(L_{r,m,max}^{l}+L_{r,m,min}^{l}\right) - \sum_{n=1}^{N} L_{r,m,n}^{l}}, & \text{otherwise} \end{cases}$$

where $$L_{r,m,max}^{l} = \max_{n} L_{r,m,n}^{l} \text{ and } L_{r,m,min}^{l} = \min_{n} L_{r,m,n}^{l} \text{ and } L_{r,m,n}^{l}$$

is either the prior or new LMs calculated from equation (19). This expression ensures that in the next update cycle, highly congested carriers are deprioritized compared to less congested carriers. This formulation is applicable when the number of resources of carriers of the same band are the same.

In an in-band carrier assignment of option 3, proportional resource allocation may be provided. In this case, the carrier assignment probability $$\left(u_{r,m,n}^{l}\right)$$

for the third option uses the following equation, wherein the value is the ratio of the total number of resources for a carrier in relation to the band:

$$u_{r,m,n}^{l,option3} = \frac{K_{total,m,n}^{total}}{K_{total,m,total}^{total}} \quad (18)$$

The third option may assume that users can be reassigned during the next update period or that a significant number of new users will be added or dropped during the next update period.

According to an example embodiment, a DNN may be used to determine the optimized TDD UL/DL split proportions and resource pool split proportions, which correspond to the optimum carrier assignment that was predicted by a DQN. In an example embodiment, once the optimal RSS/PHR threshold updates and carrier assignment probabilities are determined, the corresponding update in load metrics for a given change in carrier assignment threshold may be predicted by means of a DNN. The predicted load metric update may then be used to find the optimized TDD UL/DL split proportions and resource pool split proportions. In addition, the DNN model inputs and outputs may be the prior and new LB configurations and the corresponding prior and new load metrics, while the training may involve backpropagation to tune the DNN weights.

In an example embodiment, a component of the RL LB may include the prediction of the change in the load metrics when users are assigned or reassigned to the different carriers. Further, the new LMs may be used to determine the optimal split proportions via closed-form solutions. In addition, the architecture of the LM prediction DNN, such as a type of neural network (e.g., recurrent, convolutional, multi-layer perceptron), number of layers, number of nodes per layer, etc., may be up to implementation discretion. In particular, the set of inputs and outputs may be set as: (1) LB Configuration Update (Change in RSS/PHR thresholds)

$$S_{r,m}^{l,update} \forall\, r, m, l;$$

(2) prior load Metrics $$L_{r,m,n}^{l,prior} \forall\, r, m, n, l;$$

(3) prior LB configuration including: a) RSS/PHR thresholds $$S_{r,m}^{l,prior} \forall\, r, m, l,$$

b) UL/DL Split proportion $$K_{total,m,n}^{l} \forall\, m, n, l$$

(optional), and c) resource Pool Split Proportion $$K_{r,m,n}^{l} \forall\, r, m, n, l$$

(optional); (4) prior $$SINR\ PMF\ \left(PMF\!\left(\chi_{r,m,n}^{l,prior}\right)\right)$$

for one or more r, m, n, l (optional); (5) prior $$RSS/PHR\ PMF\ \left(PMF\!\left(\xi_{r,m,n}^{l,prior}\right)\right)$$

for one or more r, m, n, l (optional); and (6) time stamps (optional).

According to an example embodiment, optional inputs may include the RSS/PHR probability mass function (PMF) and time stamps. The PMFs may offer additional information to the LB in setting the RSS/PHR thresholds, while the time stamps may account for cyclical traffic behavior, and may consist of the time of the day and day of the week.

In an example embodiment, the inputs may be from the collected measurements and configurations at one or more prior update intervals. Each set of DNN inputs for an update interval may have its own set of DNN input nodes, or the data from several update intervals may be linearly combined to produce a single set of DNN input nodes. If the set of inputs of consecutive update intervals are to be consecutively input, a recurrent neural network architecture may be beneficial in accurately predicting the outputs.

Figure 7:
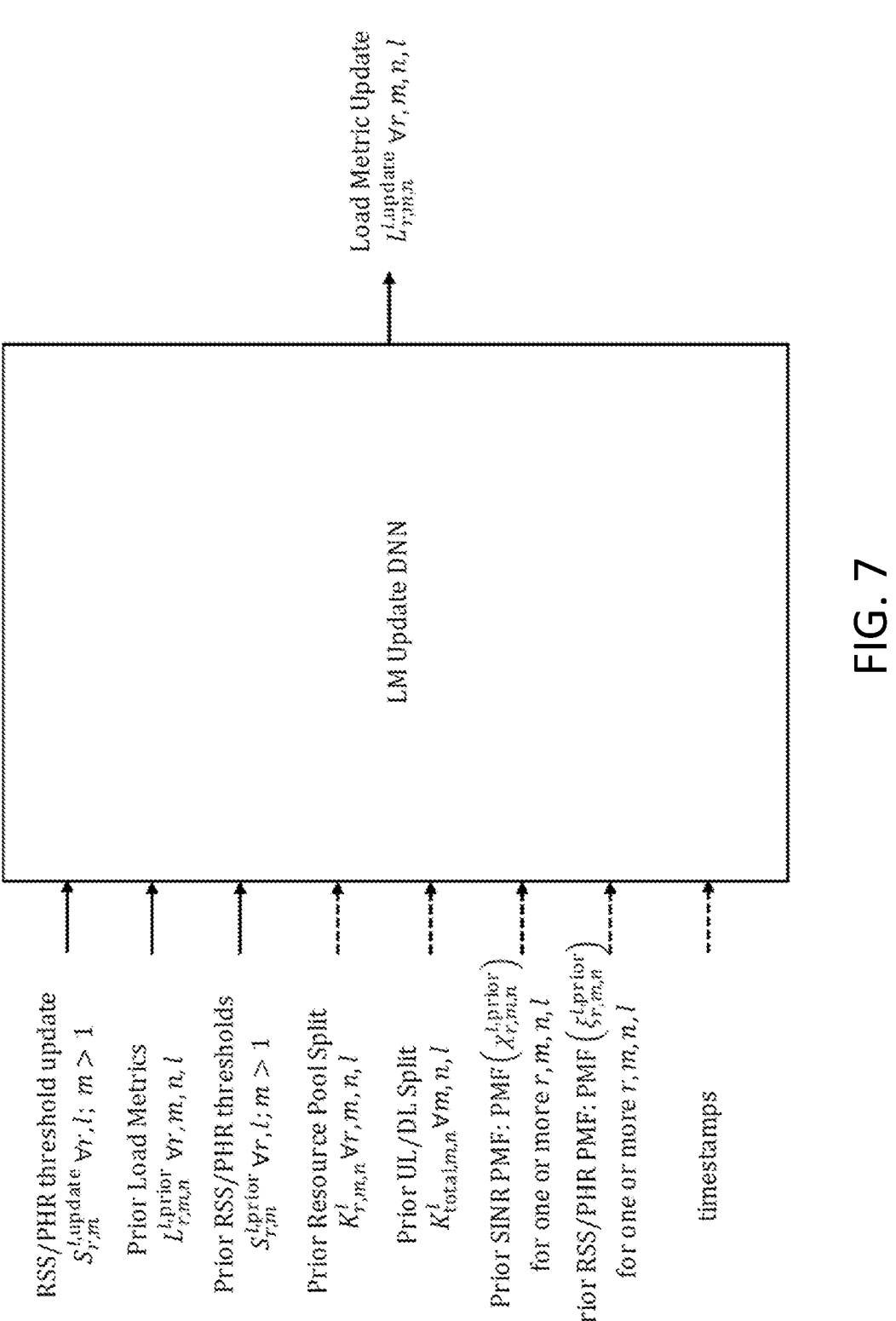
FIG. 7 illustrates an example of a reinforcement learning load balancer load metric update deep neural network (DNN) inputs and outputs, according to an example embodiment.

FIG. 7 illustrates an example of a reinforcement learning load balancer LM update DNN inputs and outputs, according to an example embodiment. In an example embodiment, the predicted change in LMs may be represented by $$L_{r,m,n}^{l,update}.$$

The predicted new LMs $$\left(L_{r,m,n}^{l,new}\right)$$

may be obtained from the prior value $$\left(L_{r,m,n}^{l,prior}\right)$$

and the predicted update value $$\left(L_{r,m,n}^{l,update}\right)$$

that is generated by the DNN as follows:

$$L_{r,m,n}^{l,new} = L_{r,m,n}^{l,prior} + L_{r,m,n}^{l,update} \forall\, r, m, n. \qquad (19a)$$

$$L_{r,m,n}^{l,update} = L_{r,m,n}^{l,new} - L_{r,m,n}^{l,prior} + \forall\, r, m, n. \qquad (19b)$$

As shown above, equation (19a) may be used during the DNN prediction including, for example, during the DNN inference step, while equation (19b) may be used during the training backpropagation step. The specific inputs and outputs are illustrated in FIG. 7.

As noted herein, the UL/DL split proportions and resource pool split proportions may be calculated from the updated load metrics. According to an example embodiment, from predicted or measured load metrics, equations (7c), (7d), (7e), (8) may be used to find optimized split proportions. For example, the new UL/DL split proportions may be found for a carrier with:

$$K_{total,m,n}^{l,new} = \qquad (20)$$

$$\max\left(\min\left(\text{round}\left(K_{total,m,n}^{total}\frac{L_{total,m,n}^{l,new}}{L_{total,m,n}^{l,new}}\right),\, K_{total,m,n}^{l,max}\right),\, K_{total,m,n}^{l,min}\right).$$

In another example embodiment, the new resource pool split proportions may be found with:

$$K_{r,m,n}^{l,new} = \max\left(\min\left(\text{round}\left(K_{total,m,n}^{l}\frac{L_{r,m,n}^{l,new}}{L_{total,m,n}^{l,new}}\right),\, K_{r,m,n}^{l,max}\right)K_{r,m,n}^{l,min}\right). \qquad (21)$$

According to an example embodiment, for FDD carriers, the UL/DL split proportions may be constant, and do not need to be calculated. The new optimized split proportions may be communicated by the LB to the RRM, and then applied to the network. In addition, the split proportions along with the LMs may be used to calculate the load balance metric F (equation (6a)), which may then be used to determine the predicted reward (equation (13)) and Q-values (equation (12)) during the DQN training phase.

In an example embodiment, the average SINR of a UE may be predicted within an update period using at least one prior SINR/RSS/PHR samples, predicted load metric, predicted resource split, and DNNs. According to an example embodiment, the predicted average SINR may be used to calculate a predicted user throughput, which may represent a criterion for carrier assignments.

According to an example embodiment, in the first carrier assignment option described herein ("Maximize User Throughput"), a user may be assigned a carrier that potentially maximizes its throughput, based on the expected SINR on the carrier and the amount of resources on the carrier. The average SINR of a UE may dynamically change within an LB update period, and may be different from the averaged SINR of prior measurements. Thus, directly substituting past SINR measurement samples for future SINR samples would yield inaccurate average throughput predictions. However, by reliably predicting the average SINR of a UE through a DNN, more optimized carrier assignments may be performed.

In an example embodiment, DNN may be used to predict the average SINR of a user $$\left(\chi_{r,m,n}^{-l,u,predict}\right)$$

based on the ff. input. According to certain example embodiments, the SINR DNN input may include: (1) prior average SINR of user at same carrier:

$$\chi_{r,m,n}^{-l,u,prior};$$

(2) prior average RSS/PHR of user at same carrier:

$$\xi_{r,m,n}^{-l,u,prior};$$

(3) predicted load metric of carrier $$L_{r,m,n}^{l,new};$$

(4) predicted resource pool split of carrier $$K_{r,m,n}^{l,new};$$

and (5) time stamps (optional).

According to certain example embodiments, the inputs may be from the collected measurements and configurations at one or more prior update intervals. In addition, each set of DNN inputs for an update interval may have its own set of DNN input nodes. Alternatively, the data from several update intervals may be linearly combined to produce a single set of DNN input nodes. In an example embodiment, if each update period's set has its own set of DNN input nodes, a recurrent neural network architecture may be beneficial in accurately predicting DNN outputs.

Figure 8:
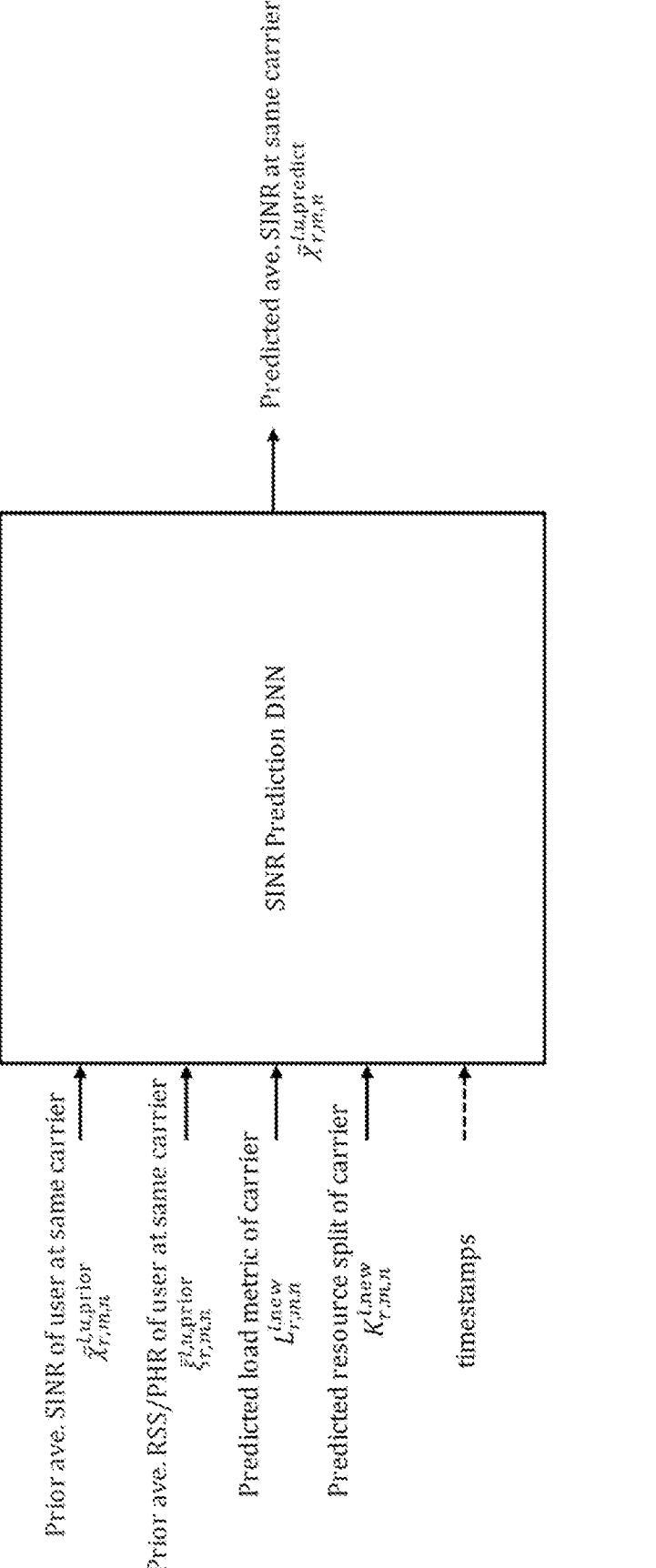
FIG. 8 illustrates an example of reinforcement learning load balancer signal-to-interference-plus-noise ratio prediction DNN inputs and outputs, according to an example embodiment.

FIG. 8 illustrates an example of reinforcement learning load balancer SINR prediction DNN inputs and outputs, according to an example embodiment. The predicted average SINR of a user at the carrier may be represented by:

$$\overline{\chi}_{r,m,n}^{l,u,new}.$$

In addition, the input/output diagram of the SINR prediction DNN is illustrated in FIG. 8. According to an example embodiment, during the deep learning prediction phase, the predicted LMs and resource pool splits may be calculated by the LM DNN and derived from equations (18) to (20). However, during the training phase, actual measured values of load metrics may be used.

In an example embodiment, calculating the average SINR/RSS/PHR from multiple samples over the course of an update period may be left to implementation discretion. Moreover, the architecture (e.g., convolutional NN, recurrent NN, etc.), hyper-parameterization, and method of training the DNN may be left to implementation discretion.

Figure 9:
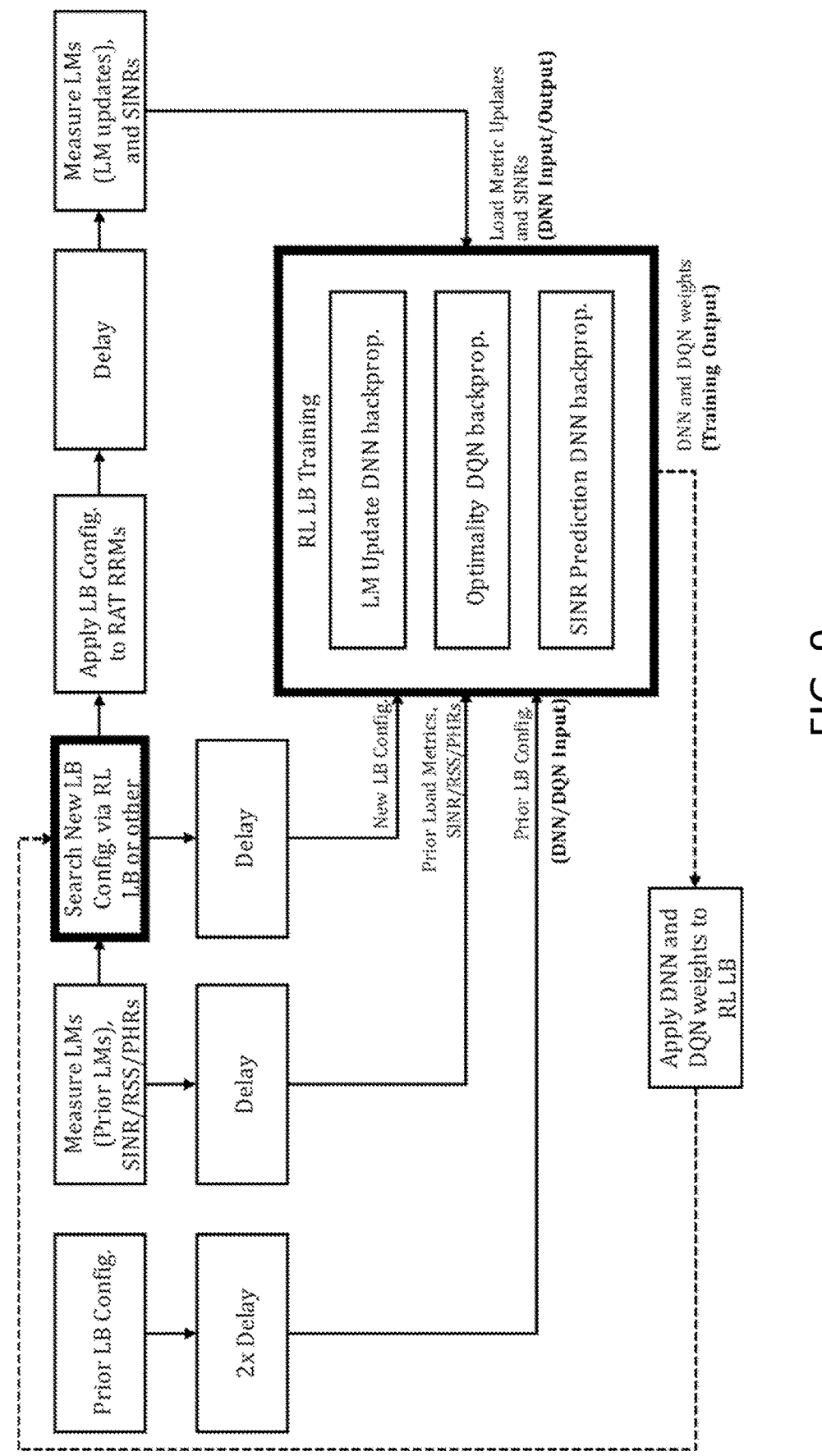
FIG. 9 illustrates an example of a RL load balancer online training and search procedure, according to an example embodiment.

FIG. 9 illustrates an example of a RL load balancer online training and search procedure, according to an example embodiment. In an example embodiment, a method of collecting samples from simulations and real-world networks for training the DQN and DNNs may be provided. For example, training the RL load balancer may include collecting time-aligned training samples from simulations or real-world networks. This may be accomplished by means of time-alignment of configurations and LM measurements by means of delays, as illustrated in FIG. 9. After online or offline training through backpropagation, the DQN and DNN weights may be applied to the RL LB.

According to an example embodiment, online training may refer to the continuous adaptation of the DNN and DQN during simulation or network operation. Once weights are updated through the latest configuration and corresponding measurements, they may be applied for the next configuration opportunity.

FIG. 10 illustrates an example flow diagram of a method, according to an example embodiment. In certain example embodiments, the flow diagram of FIG. 10 may be performed by apparatus 10 illustrated in FIG. 12a, which may include, for example, a reinforcement learning load balancer. According to one example embodiment, the method of FIG. 10 may include initially, at 100, receiving, from a radio resource manager, a load metric related to available resources of a carrier. The method may also include, at 105, applying an optimality criterion on the load metric. According to an example embodiment, applying the optimality criterion may include incorporating the load metric across a radio link, a radio carrier, a radio band, and a radio access technology. In another example embodiment, applying the optimality criterion may include incorporating at least one constraint on resource pool proportions and carrier assignment thresholds.

The method may further include, at 110, calculating, based on the load metric, an update to carrier assignment parameters for a user. In addition, the method may include, at 115, calculating, based on the load metric, an update to uplink/downlink split proportions and resource pool split proportions. Further, the method may include, at 120, predicting an average signal-to-interference-plus-noise ratio of a user equipment within an update period. According to an example embodiment, the prediction of the average signal-to-interference-plus-noise ratio may be performed using prior signal-to-interference-plus-noise ratio, prior received signal strength or prior power head room samples, the predicted impact to the load metric, and the updated uplink/downlink split proportions and the updated resource pool split proportions.

Additionally, the method may include, at 125, predicting an impact of the update to the carrier assignment parameters, the update to the uplink/downlink split proportions, and the update to the resource pool split proportions to the load metric. In addition, the method may include, at 130, calculating a Q-function value. Further, at 135, the method may include, based on the Q-function value, passing the updated carrier assignment parameters, the updated uplink/downlink split proportions, and the updated resource pool split proportions to a succeeding stage of a plurality of the plurality of stages.

The method may also include, at 140, communicating the update to carrier assignment parameters, the update to uplink/downlink split proportions, and the update to resource pool split proportions to one or more radio resource managers of corresponding one or more radio access technologies for application to a communication network. Further, at 145, the method may include repeating steps 110, 115, and 120.

According to an example embodiment, the load metric may include at least one of an instantaneous throughput, averaged throughput, resource utilization, and amount of data waiting to be transmitted. According to another example embodiment, the updated carrier assignment parameters may include new received signal strength or new power head room thresholds. In a further example embodiment, the updated carrier assignment parameters may be determined by a multi-stage deep-Q-network, and the updated uplink/downlink split proportions and the updated resource pool split proportions may be determined by a deep neural network based on the updated carrier assignment parameters and the predicted impact.

Figure 11:
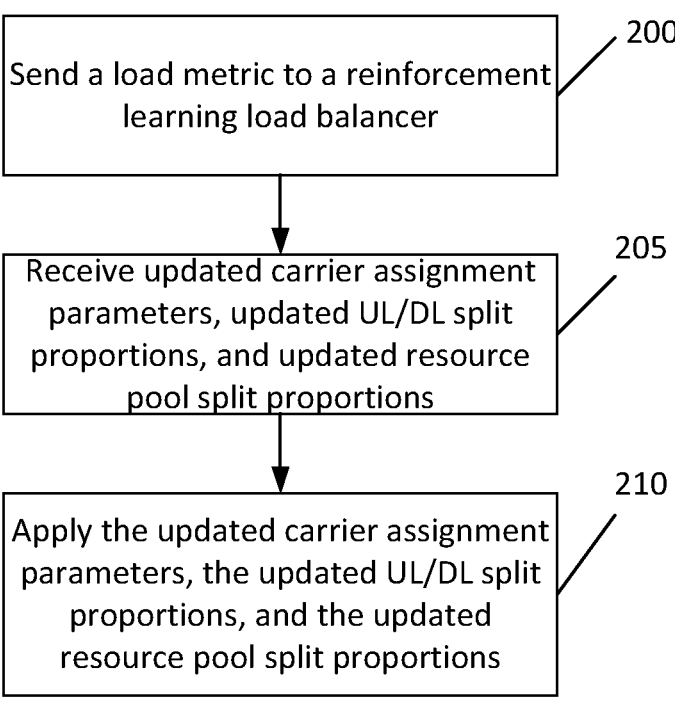
FIG. 11 illustrates an example flow diagram of another method, according to an example embodiment.

FIG. 11 illustrates an example flow diagram of another method, according to an example embodiment. In certain example embodiments, the flow diagram of FIG. 11 may be performed by apparatus 20 illustrated in FIG. 12b, including, for example, a radio resource manager.

According to one example embodiment, the method of FIG. 11 may include initially, at 200, sending, to a reinforcement learning load balancer, a load metric related to available resources of a carrier. The method may also include, at 205, receiving updated carrier assignment parameters, updated uplink/downlink split proportions, and updated resource pool split proportions. In addition, the method may include, at 210, applying the updated carrier assignment parameters, the updated uplink/downlink split proportions, and the updated resource pool split proportions to a communication network.

According to an example embodiment, the load metric may include at least one of an instantaneous throughput, averaged throughput, resource utilization, and amount of data remaining in the transmission buffer. In another example embodiment, the updated carrier assignment parameters may include new received signal strength or new power head room thresholds. In a further example embodiment, the updated carrier assignment parameters may be determined by a multi-stage deep-Q-network. According to another example embodiment, the updated uplink/downlink split proportions and the updated resource pool split proportions may be determined by a deep neural network based on the updated carrier assignment parameters and the predicted impact.

Figure 12A:
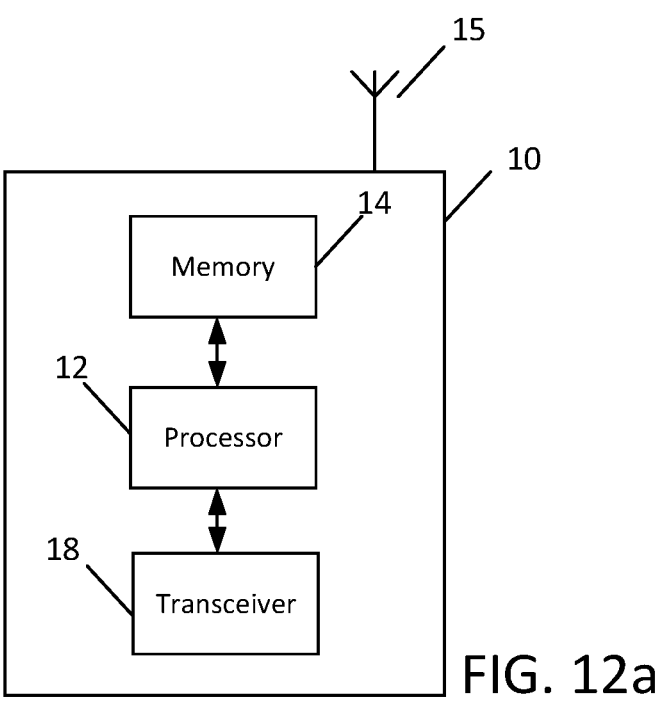
FIG. 12*a* illustrates an apparatus, according to an example embodiment.

FIG. 12a illustrates an apparatus 10 according to an example embodiment. In an embodiment, the apparatus 10 may be a node or element in a communications network or associated with such a network, such as a reinforcement learning load balancer, or other device.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 12a.

As illustrated in the example of FIG. 12a, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 12a, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 4-10.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 4-10.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 10 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 28 may be included in or may form a part of transceiving circuitry.

As discussed above, according to certain example embodiments, apparatus 10 may be a reinforcement learning load balancer for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to receive, from a radio resource manager, a load metric related to available resources of a carrier. The apparatus 10 may also be controlled by memory 14 and processor 12 to calculate, based on the load metric, an update to carrier assignment parameters for a user. In addition, the apparatus 10 may be controlled by memory 14 and processor 12 to calculate, based on the load metric, an update to uplink/downlink split proportions and resource pool split proportions. Further, apparatus 10 may be controlled by memory 14 and processor 12 to predict an impact of the update to the carrier assignment parameters, the update to the uplink/downlink split proportions, and the update to the resource pool split proportions to the load metric. In addition, the apparatus 10 may be controlled by memory 14 and processor 12 to communicate the update to carrier assignment parameters, the update to uplink/downlink split proportions, and the update to resource pool split proportions to one or more radio resource managers corresponding to one or more radio access technologies for application to a communication network.

Figure 12B:
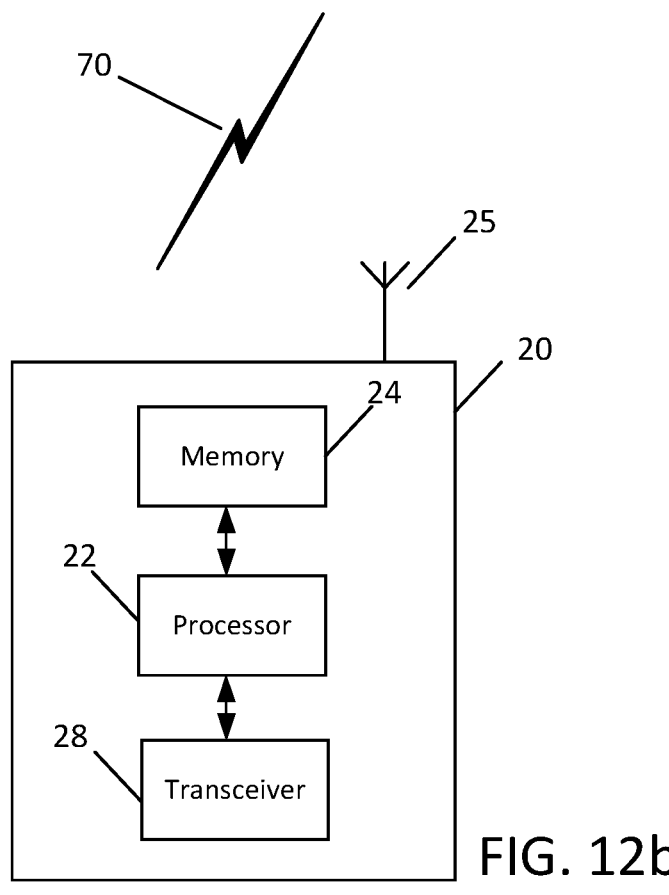
FIG. 12*b* illustrates another apparatus, according to an example embodiment.

FIG. 12b illustrates an apparatus 20 according to an example embodiment. In an example embodiment, the apparatus 20 may be a node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 12b.

As illustrated in the example of FIG. 12b, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 12b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 4-9 and 11.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 4-9 and 11.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to send, to a reinforcement learning load balancer, a load metric related to available resources of a carrier. Apparatus 20 may also be controlled by memory 24 and processor 22 receive updated carrier assignment parameters, updated uplink/downlink split proportions, and updated resource pool split proportions. In addition, apparatus 20 may be controlled by memory 24 and processor 22 to apply the updated carrier assignment parameters, the updated uplink/downlink split proportions, and the updated resource pool split proportions to a communication network.

Certain example embodiments described herein provide several technical improvements, enhancements, and/or advantages. In some example embodiments, it may be possible to achieve higher throughputs and faster convergence than iterative load balancing through the optimized joint update of LB configuration parameters using RL. It may also be possible to provide an RL algorithm that jointly calculates and applies the optimized frame configuration, resource pool configuration, and primary carrier assignment based on both historic load and predicted load. Moreover, it may further be possible to incorporate into the RL models the SINR, RSS, and PHR distributions to provide aid in performing per-user carrier assignment decisions, which may impact future load.

According to certain example embodiments, it may also be possible to achieve optimized load balancing faster and more accurately in view of the capability to perform optimized one-shot joint update of multiple LB configuration parameters through RL. In other example embodiments, it may be possible to find the optimum configuration adjustments and predict the changes in LMs due to the configuration adjustments when using a trained DQN and DNN(s). In an addition, according to certain example embodiments, it may be possible to avoid overshooting the optimized update value (and consequently avoid overshooting the optimal load balance) when using the RL method. According to other example embodiments, it may be possible to, in the multi-stage RL method model, allow for a large number of possible quantized threshold update values while reducing the complexity of the DQN by limiting the size of the DQN's output vector.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary | |
| --- | --- |
| ACPF | Average Cell Proportionally Fair |
| ARPSU | Average Resource Pool Share Utilization |
| eNB | Enhanced Node B |
| DL | Downlink |

-continued

| Partial Glossary | |
|---|---|
| DNN | Deep Neural Network |
| DQN | Deep Q Network |
| DSS | Dynamic Spectrum Sharing |
| gNB | 5G or NR Base Station |
| HFB | High Frequency Band |
| LB | Load Balancing |
| LFB | Low Frequency Band |
| LM | Load Metric |
| LTE | Long Term Evolution |
| MC | Multi-carrier |
| NN | Neural Network |
| NR | New Radio |
| PCA | Primary Carrier Assignment |
| PF | Proportionally Fair |
| PHR | Power Head Room |
| QoS | Quality-of-Service |
| RAT | Radio Access Technology |
| RL | Reinforcement Learning |
| RP | Resource Pool |
| RRM | Radio Resource Manager |
| RSS | Received Signal Strength |
| SS | Spectrum Sharing |
| TC | Tight Coupling |
| TDD | Time Division Duplex |
| UE | User Equipment |
| UL | Uplink |

We claim:

1. An apparatus, comprising:

a plurality of stages;

at least one processor; and at least one memory comprising computer program code, the at least one memory and the computer program code are configured, with the at least one processor to cause the apparatus at least to receive, from a radio resource manager, a load metric related to available resources of a carrier, wherein the load metric comprises a historic load metric and a predicted future load metric;

calculate, based on the load metric and signal-to-interference-plus-noise ratio, receive signal strength, and power headroom distributions, an update to carrier assignment parameters for a user;

calculate, based on the load metric, an update to uplink/downlink split proportions and resource pool split proportions;

predict an impact of the update to the carrier assignment parameters, the update to the uplink/downlink split proportions, and the update to the resource pool split proportions to the load metric;

communicate the update to carrier assignment parameters, the update to uplink/downlink split proportions, and the update to resource pool split proportions to one or more radio resource managers of corresponding one or more radio access technologies for application to a communication network;

calculate a Q-function value; and based on the Q-function value, pass the updated carrier assignment parameters, the updated uplink/downlink split proportions, and the updated resource pool split proportions to a succeeding stage of the plurality of stages.

2. The apparatus according to claim 1, wherein the at least one memory and the computer program code are further configured, with the at least one processor to cause the apparatus at least to, at each succeeding stage of the plurality of stages, based on previous split proportions, carrier assignment parameters, and predicted load metrics:

calculate a subsequent update to carrier assignment parameters for a user;

calculate a subsequent update to uplink/downlink split proportions and resource pool split proportions; and predict a subsequent impact of the subsequent update to the carrier assignment parameters, the subsequent update to the uplink/downlink split proportions, and the subsequent update to the resource pool split proportions to the load metric.

3. The apparatus according to claim 1, wherein the load metric comprises at least one of an instantaneous throughput, averaged throughput, resource utilization, and amount of data waiting to be transmitted.

4. The apparatus according to claim 1, wherein the at least one memory and the computer program code are further configured, with the at least one processor to cause the apparatus at least to apply an optimality criterion on the load metric, wherein applying the optimality criterion comprises incorporating the load metric across a radio link, a radio carrier, a radio band, and a radio access technology, and incorporating at least one constraint on resource pool proportions and carrier assignment thresholds.

5. The apparatus according to claim 1, wherein the updated carrier assignment parameters comprise new received signal strength or new power head room thresholds.

6. The apparatus according to claim 1, wherein the updated carrier assignment parameters are determined by a multi-stage deep-Q-network, and wherein the updated uplink/downlink split proportions and the updated resource pool split proportions are determined by a deep neural network based on the updated carrier assignment parameters and the predicted impact.

7. The apparatus according to claim 1, wherein the at least one memory and the computer program code are further configured, with the at least one processor to cause the apparatus at least to predict an average signal-to-interference-plus-noise ratio of a user equipment within an update period using prior signal-to-interference-plus-noise ratio, prior received signal strength or prior power head room samples, the predicted impact to the load metric, and the updated uplink/downlink split proportions and the updated resource pool split proportions.

8. An apparatus, comprising:

at least one processor; and at least one memory comprising computer program code, the at least one memory and the computer program code are configured, with the at least one processor to cause the apparatus at least to send, to a reinforcement learning load balancer, a load metric related to available resources of a carrier, wherein the load metric comprises a historic load metric and a predicted future load metric;

receive updated carrier assignment parameters, updated uplink/downlink split proportions, and updated resource pool split proportions, wherein the updated carrier assignment parameters are dependent upon the load metric, and signal-to-interference-plus-noise ratio, receive signal strength, and power headroom distributions; and apply the updated carrier assignment parameters, the updated uplink/downlink split proportions, and the updated resource pool split proportions to a communication network,

wherein the updated carrier assignment parameters are determined by a multi-stage deep-Q-network, and wherein the updated uplink/downlink split proportions and the updated resource pool split proportions are determined by a deep neural network based on the updated carrier assignment parameters and the predicted impact.

9. The apparatus according to claim 8, wherein the load metric comprises at least one of an instantaneous throughput, averaged throughput, resource utilization, and amount of data remaining in the transmission buffer.

10. The apparatus according to claim 8, wherein the updated carrier assignment parameters comprise new received signal strength or new power head room thresholds.

11. A method, comprising:

receiving, at a reinforcement learning load balancer, a load metric related to available resources of a carrier, wherein the load metric comprises a historic load metric and a predicted future load metric, and wherein the reinforcement load balancer comprises a plurality of stages;

calculating, based on the load metric, an update to carrier assignment parameters for a user;

calculating, based on the load metric and signal-to-interference-plus-noise ratio, receive signal strength, and power headroom distributions, an update to uplink/downlink split proportions and resource pool split proportions;

predicting an impact of the update to the carrier assignment parameters, the update to the uplink/downlink split proportions, and the update to the resource pool split proportions to the load metric;

communicating the update to carrier assignment parameters, the update to uplink/downlink split proportions, and the update to resource pool split proportions to one or more radio resource managers of corresponding one or more radio access technologies for application to a communication network;

calculating a Q-function value, and based on the Q-function value, passing the updated carrier assignment parameters, the updated uplink/downlink split proportions, and the updated resource pool split proportions to a succeeding stage of the plurality of stages.

12. The method according to claim 11, wherein the method further comprises, at each succeeding stage of the plurality of stages, based on previous split proportions, carrier assignment parameters, and predicted load metrics:

calculating a subsequent update to carrier assignment parameters for a user;

calculating a subsequent update to uplink/downlink split proportions and resource pool split proportions; and predicting a subsequent impact of the subsequent update to the carrier assignment parameters, the subsequent update to the uplink/downlink split proportions, and the subsequent update to the resource pool split proportions to the load metric.

13. The method according to claim 11, wherein the load metric comprises at least one of an instantaneous throughput, averaged throughput, resource utilization, and amount of data waiting to be transmitted.

14. The method according to claim 11, wherein the method further comprises:

applying an optimality criterion on the load metric, wherein applying the optimality criterion comprises incorporating the load metric across a radio link, a radio carrier, a radio band, and a radio access technology, and incorporating at least one constraint on resource pool proportions and carrier assignment thresholds.

15. The method according to claim 11, wherein the updated carrier assignment parameters comprise new received signal strength or new power head room thresholds.

16. The method according to claim 11, wherein the updated carrier assignment parameters are determined by a multi-stage deep-Q-network, and wherein the updated uplink/downlink split proportions and the updated resource pool split proportions are determined by a deep neural network based on the updated carrier assignment parameters and the predicted impact.

17. The method according to claim 11, wherein the method further comprises:

predicting an average signal-to-interference-plus-noise ratio of a user equipment within an update period using prior signal-to-interference-plus-noise ratio, prior received signal strength or prior power head room samples, the predicted impact to the load metric, and the updated uplink/downlink split proportions and the updated resource pool split proportions.

* * * * *